United States Patent [19]
Ludolph et al.

[11] Patent Number: 5,825,348
[45] Date of Patent: *Oct. 20, 1998

[54] DESK DRAWER USER INTERFACE

[75] Inventors: Frank Ludolph, Menlo Park; George Norman, Fremont; Joel Spiegel, San Jose, all of Calif.

[73] Assignee: Apple Computer, Inc., Cupertino, Calif.

[ * ] Notice: The term of this patent shall not extend beyond the expiration date of Pat. No. 5,745,096.

[21] Appl. No.: 780,626

[22] Filed: Jan. 8, 1997

Related U.S. Application Data

[63] Continuation of Ser. No. 480,969, Jun. 7, 1995, Pat. No. 5,657,049, which is a continuation of Ser. No. 90,470, Jul. 12, 1993, abandoned, which is a continuation of Ser. No. 709,715, Jun. 3, 1991, abandoned.

[51] Int. Cl.$^6$ ........................................ G09G 5/00
[52] U.S. Cl. ............................ 345/115; 345/342
[58] Field of Search ..................... 345/113, 115, 345/118, 119, 120, 121, 145, 146, 156, 157, 339, 340, 342; 395/339, 340, 342, 343, 344

[56] References Cited

U.S. PATENT DOCUMENTS

| | | | |
|---|---|---|---|
| Re. 32,632 | 3/1988 | Atkinson | 340/709 |
| 4,555,775 | 11/1985 | Pike | 364/900 |
| 4,653,020 | 3/1987 | Cheselka et al. | 364/900 |
| 4,688,167 | 8/1987 | Agarwal | 364/200 |

(List continued on next page.)

FOREIGN PATENT DOCUMENTS

| | | |
|---|---|---|
| 0483777A3 | 5/1992 | European Pat. Off. . |
| 0514307A3 | 11/1992 | European Pat. Off. . |
| 2693810 | 1/1994 | France . |
| WO8911694 | 11/1989 | WIPO . |

OTHER PUBLICATIONS

Jeff Duntemann *Complete Turbo Pascal*, Third Edition, Scott, Foresman and Company pp. 528–548, 1986–1989.

Jeff Johnson and Teresa L. Roberts "The Xerox Star: A Retrospective" *Computer* Sep. 22, 1989, No. 9, pp. 11–27.

Brad A. Myers "Window Interface: A Taxonomy of Window Manager User Interfaces" *I.E.E.E. Computer Graphics and Applications* Sep. 8, 1988, No. 5, pp. 65–83.

(List continued on next page.)

*Primary Examiner*—Regina Liang
*Attorney, Agent, or Firm*—Blakely, Sokoloff, Taylor & Zafman

[57] ABSTRACT

A display oriented software user interface for the generation and display of a secondary display region within a primary display region of a computer controlled information management system having windows or localized sections of displayable information and icons. The secondary display region, Desk Drawer, providing advanced capabilities to the management system by generating a readily accessible region wherein icons may be placed and always accessed thereafter when the secondary display region is present. The presence of the secondary display region may be governed by a separate screen region responsive to the cursor display position.

10 Claims, 12 Drawing Sheets

U.S. PATENT DOCUMENTS

| | | | |
|---|---|---|---|
| 4,689,737 | 8/1987 | Grant | 364/200 |
| 4,712,191 | 12/1987 | Penna | 364/900 |
| 4,769,636 | 9/1988 | Iwami et al. | 340/724 |
| 4,780,709 | 10/1988 | Randall | 340/721 |
| 4,783,648 | 11/1988 | Homma et al. | 340/724 |
| 4,819,189 | 4/1989 | Kikuchi et al. | 364/521 |
| 4,831,556 | 5/1989 | Oono | 364/521 |
| 4,862,389 | 8/1989 | Takagi | 364/521 |
| 4,899,136 | 2/1990 | Beard et al. | 340/706 |
| 5,008,853 | 4/1991 | Bly et al. | 364/900 |
| 5,040,131 | 8/1991 | Torres | 364/521 |
| 5,060,170 | 10/1991 | Bourgeois et al. | 364/521 |
| 5,107,443 | 4/1992 | Smith et al. | 395/158 |
| 5,140,677 | 8/1992 | Fleming et al. | 395/159 |
| 5,140,678 | 8/1992 | Torres | 395/159 |
| 5,202,828 | 4/1993 | Vertelney et al. | 364/419 |
| 5,293,476 | 3/1994 | Wolber et al. | 395/159 |
| 5,305,435 | 4/1994 | Bronson | 395/159 |
| 5,313,575 | 5/1994 | Beethe | 395/159 |
| 5,325,481 | 6/1994 | Hunt | 395/159 |
| 5,343,409 | 8/1994 | Satterfield et al. | 364/514 |
| 5,347,628 | 9/1994 | Brewer et al. | 395/159 |
| 5,386,564 | 1/1995 | Shearer et al. | 395/650 |

OTHER PUBLICATIONS

"Automatic Window Management Mode" *IBM Disclosure Bulletin* v. 35, No. 4B Sep. 1992 p. 31.

"Inside Macintosh: Overview" Apple Technical Library. Dec. 1992, pp. 107–130.

Richard Mander et al. "A 'Pile' Metaphor for Supporting Casual Organization f Information" 1992 pp. 627–636.

"Notebook Tabs as Target Location for Drag/Drop Operations" IBM Disclosure Bulletin. v. 35, No. 7, Dec. 1992 p. 207.

"Microsoft Windows: User's Guide" Version 3.0 Microsoft Corporation 1985–1992.

"Microsoft Windows Program Manager" Version 3.1 Microsoft Corporation 1985–1992, pp. 1–10.

"Window Shade" Version 1.1. 1989.

"The NewWave Office" Hewlett–Packard Journal, Aug. 1990, No. 4, pp. 23–31.

"Virtual Office Desktop Drawers" Research Disclosure, p. 651, Sep. 1989.

"Using Desk Top and Drawers to Predefine Paths" *Research Disclosure.* Apr. 1990. No. 312 p. 298.

"Developer's Desktop" *IBM Disclosure Bulletin,* v. 33, No. 6B, Nov. 1990, pp. 114–117.

FIG. 1
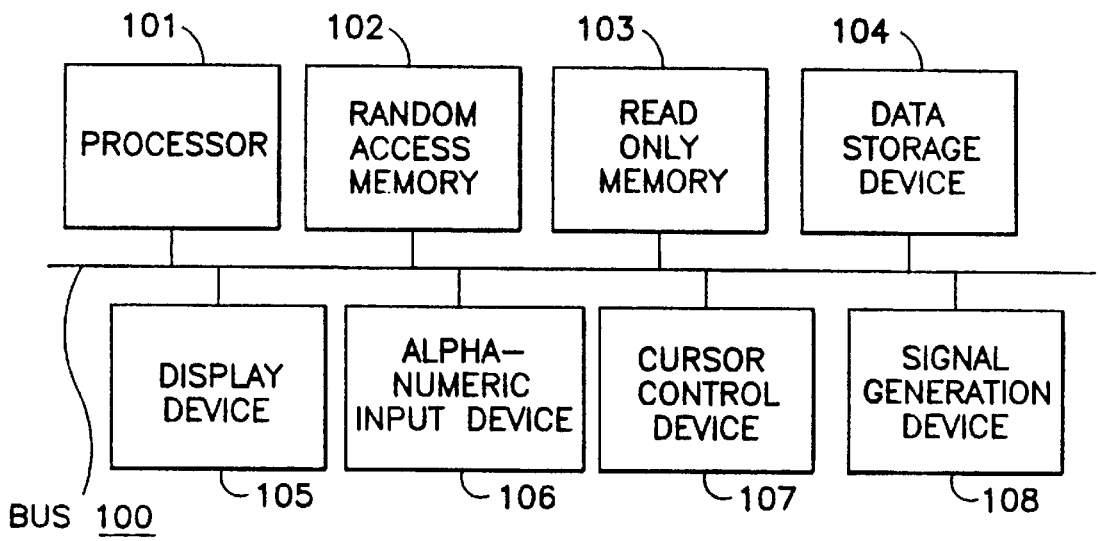
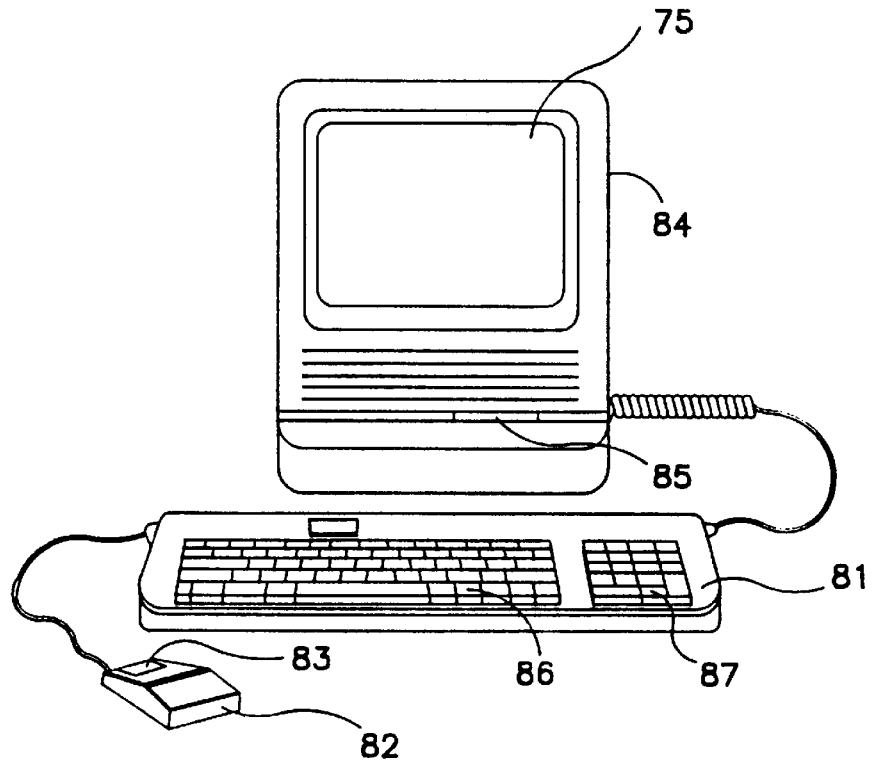
FIG. 2

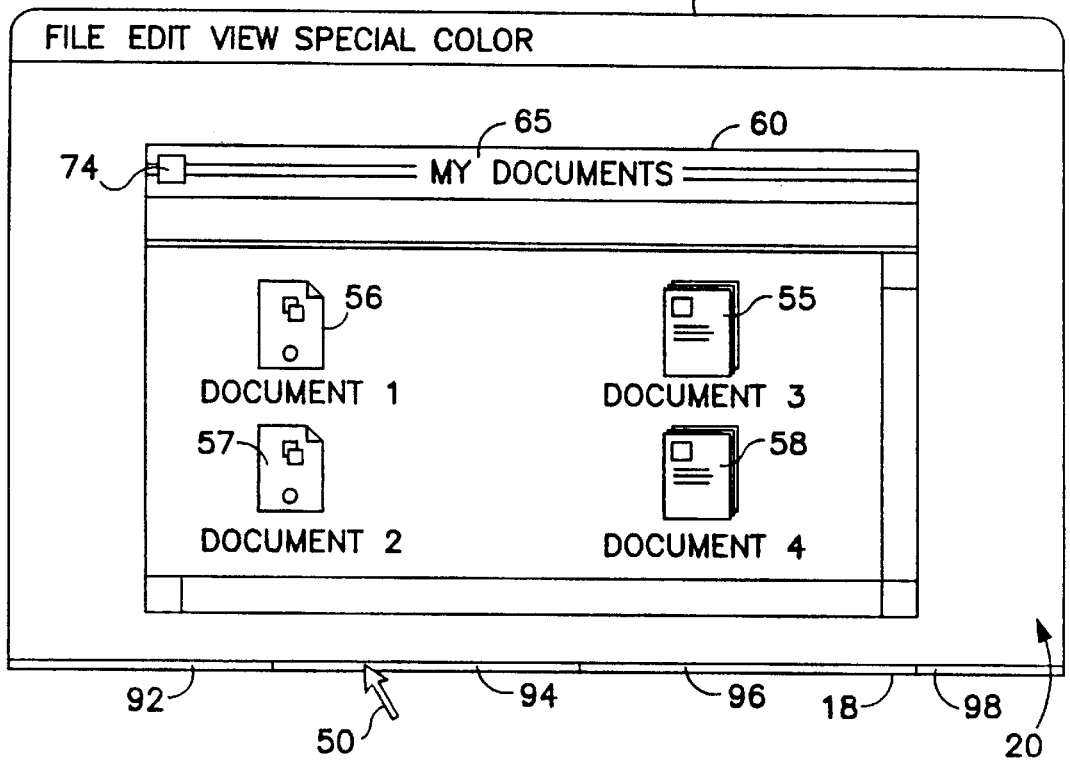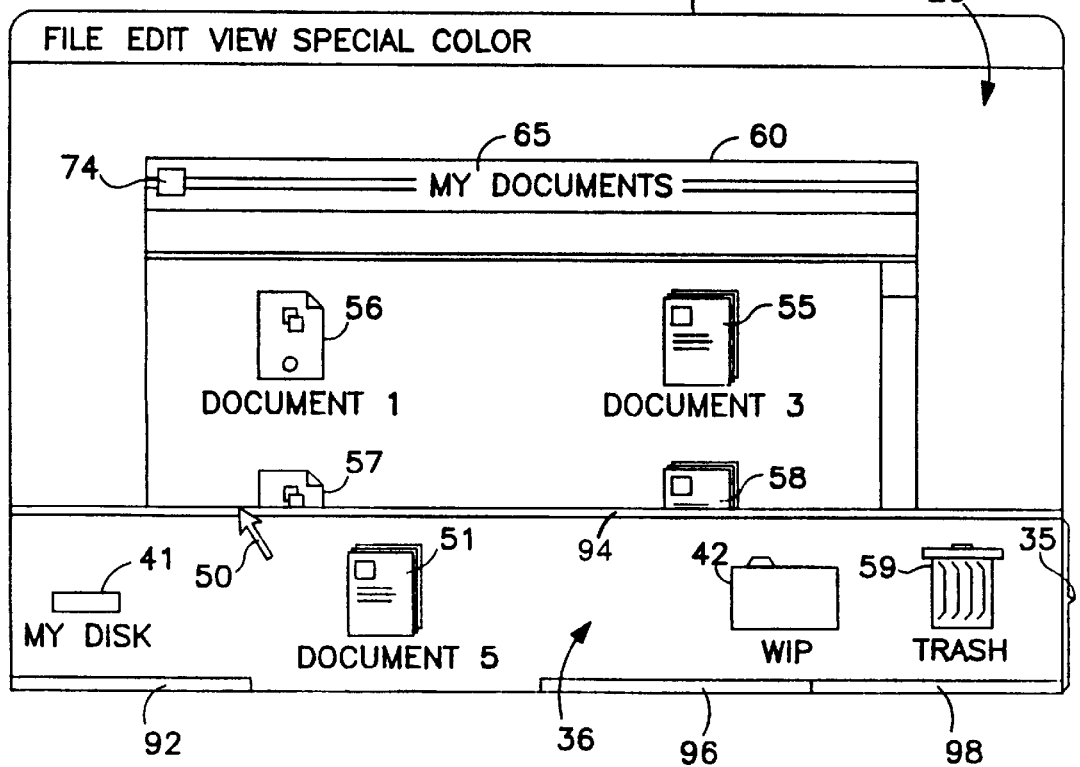

DESK DRAWER USER INTERFACE

This is a continuation of application Ser. No. 08/480,969, filed Jun. 7, 1995 now U.S. Pat. No. 5,657,049, which is a continuation of application Ser. No. 08/090,470, filed Jul. 12, 1993 abandoned, which is a continuation of application Ser. No. 07/709,715, filed Jun. 3, 1991 abandoned.

BACKGROUND OF THE INVENTION

(1) Field of the Invention

The present invention relates to a computer controlled software user interface system within an information management system. Specifically, the present invention relates to user interface systems that create and provide ready access to a secondary display region in addition to the primary display region on a two-dimensional computer data display screen. The secondary display region contains and provides varied access to sources of information.

(2) Prior Art

Information management systems, such as those which are used or can be adapted for use in computer systems, are placing increasing demands on the physical resources available for displaying information to the user. There exists a need to compartmentalize and categorize specific segments of information in order to effectuate its retrieval and management. Therefore, information management systems utilize specially developed screen displays that incorporate individual display images as well as display information formats in order to allow the user to effectively gain access to the information system. Therefore, a particular screen display can be thought of as having both display "tools" and display "information." The display tools give the user special ability to organize and manage information while the display information constitutes either the resultant data desired or the application program the user desires to operate.

The current art in the field of computer display information management technology utilizes rectangular sections of screen display area to manage the computer information. Prior art known systems include the Finder™ user interface of the Apple Macintosh™ computer which is manufactured by Apple Computer, Inc. of Cupertino, Calif. The Finder™ information management system (also referred to as "Finder™ user interface" or just "Finder™") is based on display principles using "windows" and "icons" to help manage computer information. The main or root window is called the "desktop" area, or more generally the primary display region. The desktop, or primary display region, is always open (displayed on the screen with its contents accessible or at least partially accessible), and takes up substantially the full display screen area when other windows are not open. The desktop is usually visible in the background when other windows are open.

Existing inside any particular window, including the desktop itself, other windows containing separate information or windows may contain information identifiers called "icons." An icon is a particular screen identifier for a particular collection of computer information; typically an icon may represent a "file" which is either a collection of data or a program or program segment. An icon also may represent the closed state of a window. Icons are graphic images displayed on the computer screen and usually correspond to the type of information stored within the file. Icons give the user access to the particular file represented by the graphic image when the icon is visible. The use of icons and windows is well known in the art.

The "file" is the information packet that the user wishes to utilize, create or modify; each particular file has an associated name identifying the file. Therefore, any given file may be located in the information management system by knowing a file name, an icon graphic representation associated with the name, or a window locator name. All information (files) situated within a particular window are identified with that particular window's own identification location within the computer information management system. Therefore, any particular file information can be retrieved knowing its particular identification name and its window name. Accordingly, the resulting screen display utilizing the Finder™ management system may be broken down into multiple widows and graphic icons.

Another important element of the prior art information management system is a screen cursor. The cursor, or cursor means, allows direct user control over the management system as described above. The Finder™ system is complemented with a "mouse" and a corresponding "pointer" which makes up the cursor means. The user has control over the mouse, which is a mechanical-electrical means that translates two-dimensional mouse movement into a two-dimensional screen position movement represented by an animated pointer or arrowhead. The user contacts and directs the mouse. When the mouse is moved freely on a table top then the pointer on the screen will move animated in a similar and proportional manner. The mouse also contains one or more push buttons which can be used to effectuate control over the cursor pointer by selecting or deselecting specific icons or other display tools. It is said that the cursor pointer is "activated" when the mouse button is depressed and the pointer remains active until the button is released. Pointer activation may also be initiated by sequences of mouse button presses, such as a "double click" or rapid button press twice in sequence. In the current art, certain screen window locations are sensitive and react to the cursor pointer position without activation and are often called "hot spots" or "active." When the cursor is first activated while on an deselected icon that icon becomes "selected;" and if the cursor is activated again (as in double click) then the icon is said to be "activated."

Access to information in a prior art user interface system for a display management system is therefore based on windows, icons and pointer movement of the cursor. Therefore, it is fundamental that before information may be accessed it must be displayed on the screen by an icon, name or similar representational image. This is the case because in a display screen management system the icon may not be accessed unless it is currently displayed on the screen in some form. To access a file, the cursor pointer is placed on the visible icon or visible file name and the pointer is activated. A closed window may be represented by an icon or a window name. A window opens when the pointer of the cursor rests on the visible icon or visible name representing the closed state of the window and the pointer is activated. Within the open window, files may be displayed by icon or by name. An open window, of various geometries, may be rectangular and will exist within the display area of the main viewing screen on the desktop. Multiple windows may be open at one time, typically with the most foreground window corresponding to the most recently opened window and the background windows representing those opened previously. In the organization scheme described, it is appreciated that files are nested within windows and windows can be nested within other windows; the main or root window being the desktop area, or primary display region.

During any normal session using the window based information system, many windows can be open at one time with many displayed icons within. Windows may overlap and partially, or entirely, hide other windows or icons. What results is that the particular information the user wants to obtain may be hidden behind several layers of windows and may be difficult to access; when an icon is hidden by another window it is temporarily not accessible. This is referred to as the "window overlapping" problem. There are several instances where window overlapping problems routinely arise in prior art display management systems. A few of the more troublesome scenarios are described below.

In order to complete a task, often the user must access a single icon within an open window that exists in the background, that is, covered or partially covered by other windows. The desired icon ("target" icon) within the window is no longer visible, and therefore not presently accessible. The overlapping windows or those that lay "on top of" the target window must be closed or moved away ("shuffled") so that the target window and target icon are visible and thus accessible. Window shuffling is time consuming, confusing and often very tedious for the user. If multiple routine icons need to be systematically accessed in sequence then multiple window shuffling procedures may be required. It is extremely desirable to have an advantageous system that could offer ready access to certain often used icons while avoiding window shuffling. The present invention is a novel and useful way to solve the problems associated with screen management, as just described.

Another window overlap problem plaguing prior art systems arises when the user requires two icons to complete a task and each icon is within a different window. The resulting screen display may contain several open windows from past tasks that may clutter the screen display with unwanted information. This information may obscure the desired windows and icons. In many instances the overlapping windows are not unwanted, but hold the first of the desired icons in displayable view. In order to access the second desired icon, the user must close the overlapping window that holds the first icon, then gain access to the second desired icon. Since the previously closed window holds the first desired icon it must be opened again so that the present task can be completed. Again, this process is often time consuming and confusing for the user—especially when the hidden second icon is one that is routinely required. In this case the user is engaged in constant "window shuffling" as described above. The present invention is a novel and advantageous way to solve the problems associated with the screen management, as just described.

Window shuffling problems also occur when files are copied or moved from one window to another. File information is transferred between windows by displacing the icon between the windows. For instance, the prior art Finder™ provides several facilitated avenues for information movement using the cursor pointer and the icon based system. However, in order to effectively move the information, both present location and destination location windows must be visible on the display screen. The user points to the source icon, activates the cursor, then "drags" the icon to the desired destination window and deactivates the cursor pointer. The information within the icon will then be moved or copied to the destination window. Of course, this assumes that the source and destination windows are both open and viewable which is rarely the case. When multiple windows are open they typically overlap, thus blocking certain sources and destination windows. The task of moving or copying information as described above becomes difficult and tedious because certain windows must be rearranged in order to allow both source and destination window to be open and viewable. What is needed is an advantageous interface that guarantees certain window access by eliminating the window overlap condition. The present invention is a novel and useful way to solve the problems associated with the screen management as described above.

There have been several prior art methods of display screen management for information management systems to help facilitate the access and display of windows and icons on the screen. However, none of these systems have effectively solved the window shuffling and icon overlapping problem.

A known display screen management system utilizes a root or main window ("desktop") that is much larger in dimension than the displayable screen; this has been done by Tektronix. At any given moment only a fraction of the total desktop region is displayed to the user on the screen with the remainder being blocked out. The current display screen then acts as a "camera lens" that "pans" a subsection screen area of the desktop at time. By moving the mouse such that the cursor moves to the edge of the screen and then continuing to move the mouse the user causes the screen to pan in two dimensions thus shifting different portions of the desktop on (and off of) the displayable screen section. For instance, if the desktop was a two dimensional area 1 foot by 1 foot, and the screen was 0.5 foot by 0.5 foot, then the screen at any time would represent only one quarter of the total desktop. In order to see the remainder of the desktop, the user would have to scroll in two dimensions the current screen position. As new a new desktop section is uncovered, an old desktop section becomes blocked out. This screen management system however fails to provide an adequate solution to the problem of overlapping windows. This prior art system offers little in the way of preventing the window shuffling problems.

The Finder™ system prior art, while meeting with considerable success and allowing a substantial amount of access to windows and icons, does not provide the optimum solution for the problem of overlapping windows as described above. The Finder™ environment is the system in which the preferred embodiment of the present invention resides.

Other prior art includes a computer program called Multifinder™ produced by Apple Computer Inc. of Cupertino, Calif. This program allows the Finder™ to be accessible while another application is running. The user can easily switch back and forth between the Finder™ environment and the window of the current application. However, Multifinder™ does not provide an adequate solution for the window shuffling problem. Multifinder™ does not provide an area where icons (files) can be stored and later easily retrieved without reshuffling open windows. Multifinder™ merely provides an avenue for accessing the desktop while the user is within another application.

Another known utility is the Apple Menu made by Apple Computer Inc. which is included in the Finder™ environment. When the pointer is placed on the Apple logo on the top of the Desktop menu bar and the mouse button is pressed, then the Apple Menu is activated and a list of several program, document, and folder names becomes visible in a pull down menu. (For a detailed description of pull-down menus refer to U.S. Pat. No. Re. 32,632, by Atkinson, assigned to Apple Computer Inc.) Programs in the list can be invoked by mouse activation, however, the Apple Menu is not a standard Finder™ window. Accordingly, while advantageous in many aspects, the Apple Menu does not provide any mechanism whereby icons can be simply placed (dragged) inside an easy-access window receptacle using the cursor and treated as icons of any other normal window of the Finder™ environment. Further, the Apple pull-down menu automatically closes when an item in its list is activated. So the menu must be reactivated for each activated item. In sum, Apple Menu windows provide only limited access to programs of the computer system. Therefore, the Apple Menu does not offer a viable solution to the window overlapping or shuffling problems.

A program called Lumina, offered by Time Arts, Inc., provides a pop-up display called a tool palette. The palette comes up upon the cursor position reaching a certain edge of the screen, however files or icons could not be placed into nor taken out of the palette. Indeed, the palette was not a window in the most basic sense because no file information could be passed into or out of the Lumina palette. Therefore, Lumina does not offer a viable solution to the window overlapping or shuffling problems.

Disk Top is another prior art program that operates under several environments and applications and provide access to the files stored in the management system. The program creates a window for itself, in which it displays the file names of the programs within the system. This program is generally used as an avenue to quickly access the finder information while the user is within another application. The access allowed to the Finder™ is limited and considerably less than that of the Multifinder™ software system. The Disk Top system does not solve the problem of window overlap and shuffling. Disk Top does not provide any special easy-access window receptacle for icon transfer via cursor control. Disk Top provides an access path into the finder and its management tools, but does not provide any extended functions to the desktop similar to the present invention.

Therefore, there arises a tremendous need to develop a system that provides an easy access window space that can hold multiple icons (files) and upon opening at any time by the user would immediately provide access to the icons within, regardless of the number of icons placed or to be placed in the primary display region. Additionally, what is needed is such a window or secondary display region, Desk Drawer, that is always accessible when open; it opens on top of other windows currently open or windows subsequently opened outside of the secondary display region. The window, or secondary display region, must be accessed easily by the cursor pointer and must provide all the capabilities of other standard windows within the Finder™. There does not exist such an interface in the prior art.

The present invention provides such an easy-access window. The resultant interface window is called a "Desk Drawer." It is also referred to herein as a secondary display region, especially where the root window, or desktop is referred to as a primary display region. The Desk Drawer acts as an extension of the desktop environment, or primary display region, providing an always accessible window with easy access to the icons placed within.

SUMMARY OF THE INVENTION

In a computer controlled information management system including a display screen containing a primary display region, and means for simultaneously and selectively displaying within the primary display region a plurality of display windows and/or icons, some of which may block or partially block the view of others depending on the number of windows and/or icons being displayed at any given time, a display system comprising: a first means for generating and displaying a secondary display region covering at least a portion of the primary display region and any windows and/or icons being displayed within that portion of the primary display region, the secondary display region and its contents, when present, being completely viewable within the display screen; a second means for removing the secondary display region from the display screen thereby allowing the primary display region to be viewed in its entirety; a third means for displaying a plurality of icons within the secondary display region upon display of the secondary display region by the first means, the plurality of icons within the secondary display region being visible over any windows and/or icons within the primary display region; a fourth means for selectively transferring icons into the secondary display region when the secondary display region is displayed, by dragging the icons from the primary display region into the secondary display region and depositing the icons into the secondary display region; and a fifth means for selectively transferring icons from the secondary display region, when the secondary display region is displayed, by dragging the icons from the secondary display region to the primary display region, and depositing the icons into the primary display region.

The display system further wherein the fourth means for selectively transferring icons into the secondary display region includes dragging the icons from the primary display region, triggering the first means to display the secondary display region, and dragging the icons into the secondary display region displayed; and wherein the fifth means for selectively transferring icons from the secondary display region includes dragging the icons from the secondary display region, triggering the second means to remove the secondary display region, and dragging the icons into said primary display region.

BRIEF DESCRIPTION OF THE DRAWINGS

FIG. 1 is an illustration of the computer system architecture.

FIG. 2 is an illustration of the typical computer system of the preferred embodiment of the present invention.

FIG. 9a is an illustration of a Desk Drawer closed with multiple drawer space handles.

FIG. 9b is an illustration of Desk Drawer open with multiple drawer space handles and one drawer space accessible.

DETAILED DESCRIPTION OF THE INVENTION

Figure 3:
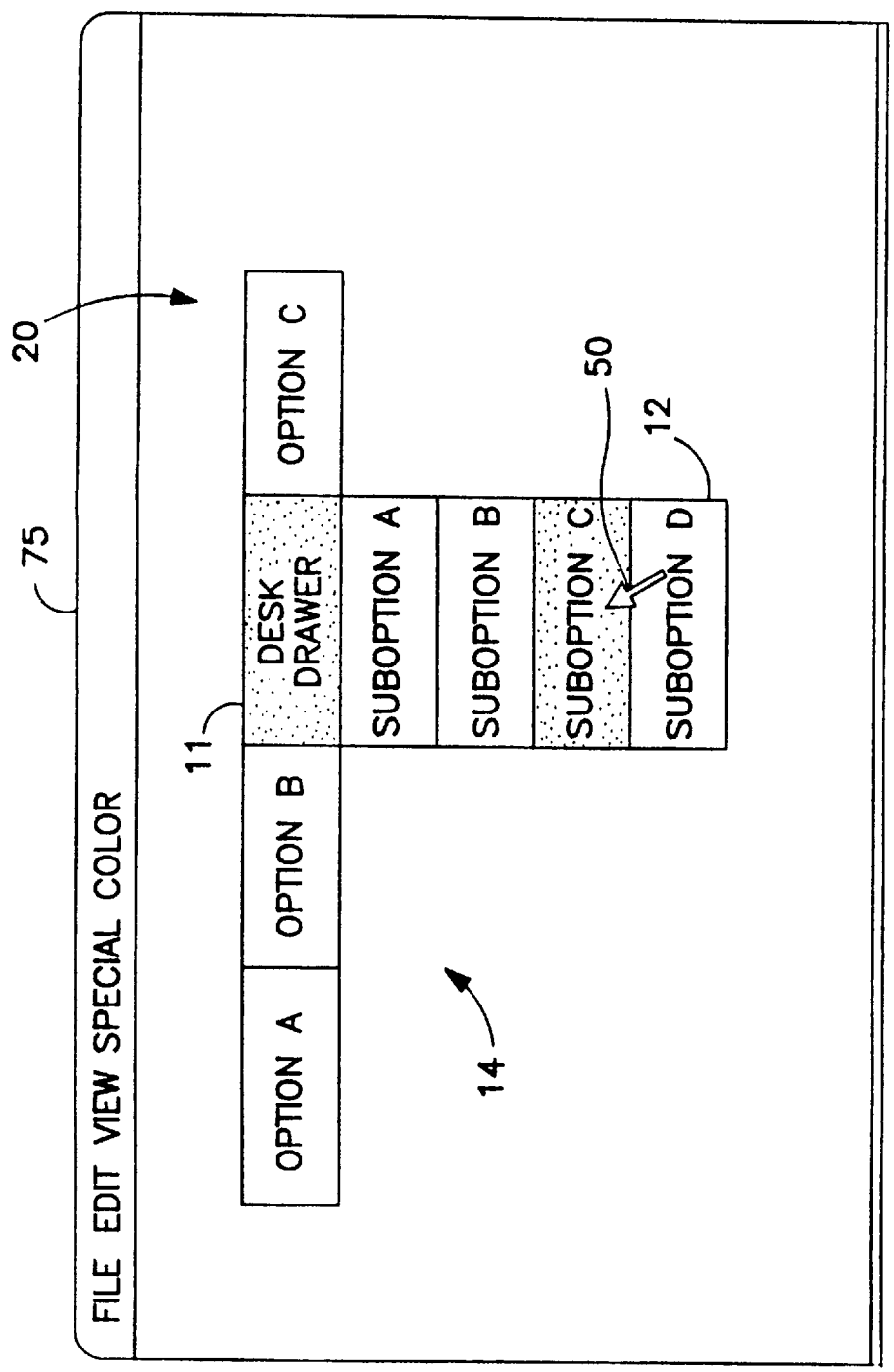
FIG. 3 is an illustration of a command or option menu for the Apple Finder™.

This invention concerns the two-dimensional selection and display of a portion of information, a secondary display region, expanding the portion of the available display area in the user interface of a computer controlled information management system. The following detailed description describes the preferred embodiment of the present invention, a two-dimensional Desk Drawer, as a means for more efficiently managing and extending the available display area of the information management system. Desk Drawer may operate, in one embodiment, as an extension of the available desktop area in the Finder™ environment. The Desk Drawer provides an easy-access window for managing any icons placed within the window.

The preferred embodiment of the present invention is implemented on an Apple Macintosh computer system using the Finder™ user interface. However, it is easily recognized that alternative computer systems may be employed (e.g. pen and tablet based systems). In general, such computer systems as illustrated in block diagram form by FIG. 1, comprise a bus 100 for 220 communicating information, a processor, 101 coupled with the bus for processing information and instructions, a random access memory 102 coupled with the bus 100 for storing information and instructions for the processor 101, a read only memory 103 coupled with the bus 100 for storing static information and instructions for the processor 101, a data storage device 104 such as a magnetic disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the processor 101, a cursor control device 107 coupled to the bus for communicating information and command selections to the processor 101, and a signal generating device 108 coupled to the bus 100 for communicating command selections to the processor 101.

The display device 105 utilized with the computer system and the present invention may be a liquid crystal device, cathode ray tube, or other display device suitable for creating images and alphanumeric characters (and ideographic character sets) recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices, including those uniquely developed for the disabled. In the discussions regarding cursor movement and/or activation within the preferred embodiment, it is to be assumed that the input cursor directing device or push button may consist any of those described above and specifically is not limited to the mouse cursor device.

FIG. 2 illustrates the basic Apple computer system that is the environment used by the preferred embodiment of the present invention. It is appreciated that the Apple computer system is only one of many computer systems that may support the present invention. For purposes of clarity and as one example, the present invention is illustrated with the Apple computer system. FIG. 2 shows the Apple™ Macintosh computer 84 which is a particular implementation of the block diagram of FIG. 1. A keyboard 81 with keys 86 and keypad 87 is attached to the computer 84 along with a mouse device 82 and mouse push button 83 for controlling the cursor. The mouse device 82 and the push button 83 make up a cursor device. It is appreciated that many other devices may be used as the cursor device, for instance the keyboard 81 may be substituted for the mouse device 82 and button 83 as just discussed above. The computer 84 also contains a disk drive 85 and a display screen 75.

The present invention, a Desk Drawer region, provides additional control and capability for the windowing and cursor based information management systems, such as the Finder™ system. These features of the present invention are described below. The general operation of windows or cursors is described only where necessary to provide a thorough understanding of the present invention since these methods are readily known to those of ordinary skill in the art.

General Operation of the Present Invention

The present invention, Desk Drawer, in the preferred embodiment to be described should be viewed fundamentally as an extension of the Finder™ desktop. This desktop computer interface was created to analogize the top of an actual office work desk with each open interface window symbolizing and resembling the files and papers placed on top of a typical office desk. When interface windows are open, they overlap each other in a similar fashion to papers and files that are scattered on a desk with the most recently placed document on the top of the pile and others found beneath. The present invention, Desk Drawer, as will be seen, includes its own window or secondary display region and is analogous to the center drawer of the office desk. For instance, when the drawer of an office desk is open, the person has access to all the contents of the drawer space regardless of what papers happen to be on the top of the desk. (The term "drawer space" refers to that space made visible and accessible to a person when a desk drawer is opened.) In essence, the drawer space, when the drawer is open, is an extension of the work space of the office desk since papers can be placed on the top of the desk or in the drawer. Similarly, regardless of the interface windows currently open, or subsequently opened in the Finder,™ the Desk Drawer interface provides an easy access avenue for the icons within the drawer space without being covered up.

In accordance with the present invention, the Desk Drawer interface is always accessible and exchanges information easily between the drawer space (secondary display region) and the desktop (primary display region) which includes open windows within the desktop. The drawer of an office desk is always accessible to the person regardless of the particular job in which he or she is engaged. Therefore, the present invention is always accessible to the user during the operation of any application program. For example, while running a word processor software application, Desk Drawer may be opened and its contents accessed; or, alternatively, items can be placed within the open drawer to be accessed later. Additionally, just as one can easily take a paper off her desk and place it into the open drawer, the Desk Drawer interface provides an easy exchange capability between information in the desktop environment and information within the drawer space. Accordingly, under the present invention, items can be moved easily between the Finder™ environment and the drawer space using the cursor device.

For example, assume an office worker routinely notes her calender during the day. She decides not to place the calender on the top of the desk because it may become buried beneath the day's office paper on top of her desk. Rather, she places the calender in the desk drawer so that regardless of the papers on the top of her desk, once she opens the drawer the calender is immediately accessible for updates. This basic theory of immediate and facilitated access of information applies and relates to the present invention, the Desk Drawer interface.

In the most general sense, the following is a description of some of the basic aspects of the Desk Drawer interface. A more detailed disclosure of Desk Drawer will follow. When the Desk Drawer user interface program is activated, by the processing logic, and the cursor appears above the screen bottom, Desk Drawer will be closed and appears as a thin handle (bar) along the bottom of the screen. Like any office drawer when closed, only the handle is visible. The width of the handle is small with respect to the screen height and is merely large enough to view and access. This handle is always present and active regardless of whether a program is operating or if the Finder™ desktop is present. When the cursor pointer tip is positioned on top of the bar this, without more, the processing logic causes the Desk Drawer to open and reveal the drawer space. The processing logic of the present invention opens Desk Drawer by "animating" upwards a predetermined, but user adjustable height (about ⅕ the height of the screen) over the screen display space to display a rectangular drawer space having width equal to that of the screen width. The handle is still visible and rests on top of the drawer space. The drawer space, having highest display priority, will cover or partially cover any display image presently on the screen. When the drawer space is visible, the icons placed within the drawer are similarly visible and therefore accessible. While the cursor is within the drawer space the computer keeps the drawer open and the cursor can access the icons. When the cursor is moved above the handle, exiting the drawer space, then, without more, the processing logic of the present invention closes the drawer and the thin handle returns to the bottom position.

While the preferred embodiment of the present invention is discussed with reference to the environment of the Finder™ desktop, such approach is for purposes of clarity. It is to be appreciated that since the Desk Drawer is always active, the preferred embodiment of the present invention can be accessed within any software application program. If another application were running, the handle bar of the Desk Drawer interface remains visible and accessible. Therefore, all of the functions and capabilities that the Desk Drawer interface affords with respect to the desktop can be applied similarly to any other application. And, since the drawer space of the Desk Drawer may be viewed as an extension of the desktop, the drawer space may allow access to the desktop while the user is within another application. Again, it is to be appreciated that the Desk Drawer is fully operational while another application program is operative.

Specific Operation of the Present Invention

A window region (window) is usually a rectangular portion of a computer display screen in which information is displayed to the user. Window regions may have different shapes, including circular, trapezoidal, or triangular. The information may be in the form of textual, numerical or graphical data. A window, for example, may be used to represent a single notecard within a stack of cards. The data displayed within the window represents the information written on the notecard. One well-known system for displaying such notecards is the Hypercard™ system distributed by Apple Computer, Inc. A window management system is an information management system that provides controls with which the user is able to select the size and location of the window within the physical boundaries of the display. The windowing system also provides controls for scrolling or selecting the portion of the data viewable within the window. The present invention, Desk Drawer, is a special user interface created to provide an easy access window, or drawer space, where icons can be placed and readily accessed via special cursor control.

In FIG. 3, a menu 14 may be used to activate the process of the present invention, however in most instances the present invention is normally active upon the initiation of the information management system via the control of the operating system software. Generally, menu 14 is comprised of a region of the display screen in which the user is presented with a list of command options. The user selects a specific option 12 within the desired command column 11 or within the desired command area using a mouse, joystick or other two-dimensional cursor control device. Suboption C is being modified by the cursor pointer 50. After the cursor is positioned, the command is selected by the activation of a function key or keys associated with the cursor control device. U.S. Pat. No. 4,464,652 reissued as U.S. Pat. No. 32,632 on Mar. 29, 1988 to inventor, William Atkinson and assigned to the assignee of the present invention discloses a device suitable for use as a cursor control device and means for implementing the described menu control. This method of command or function selection may be used as a vehicle, throughout the description of the present invention, for setting software options and enabling or disabling features. As discussed earlier, other means of command activation may also be employed for setting of software options such as the entry of a special code or command sequence from the keyboard or numeric keypad or an icon selection. An icon representing the Desk Drawer may be selected causing the computer to initiate the present invention. More commonly, the present invention may also be activated through a software interface with the computer's operating system software or other application software. Using this method, the computer activation of Desk Drawer may be automatic thus independent of direct user action.

Figure 4A:
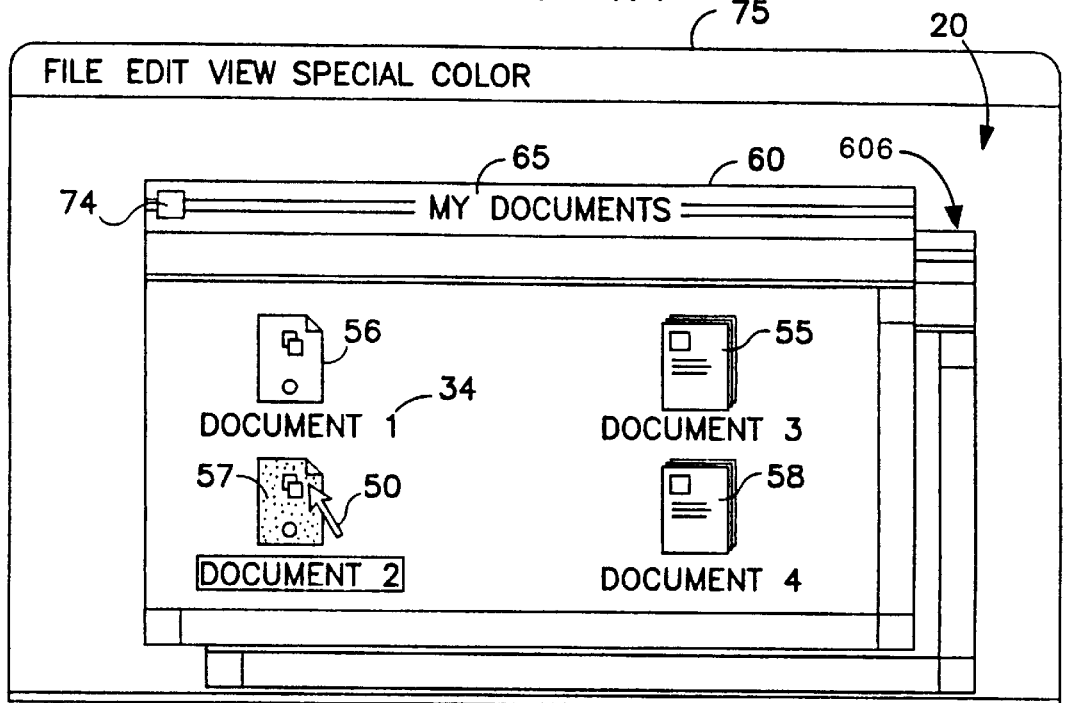
FIG. 4a is an illustration of an information management system having a center window open with icons and Desk Drawer currently in the closed state.

Refer to FIG. 4a which illustrates the Finder™ environment of the preferred embodiment as well as shows the closed state of the Desk Drawer. When the computer activates Desk Drawer, but Desk Drawer remains closed, it appears as a handle or bar 10 on the bottom of the display screen as illustrated in FIG. 4a. When in this state the handle bar is called a "first triggered display region." The Desk Drawer handle 10 is the only visible component of the present invention when the Desk Drawer remains closed. FIG. 4a also shows a typical display screen of the Apple Finder™ user interface. The display screen 75 constitutes the outer boundary of the illustration and represents the physical display console of the computer system. The desktop area 20, referred to as the primary display region, is the shaded portion of the screen visible in the background. In the lower portion of the desktop there exists an open window region 60 and inside are several icons 55, 56, 57, and 58.

Window 60 is open and therefore (as with all open windows of the Finder™) its contents may be accessible by the cursor pointer 50 when the contents are visible. All four icons 55, 56, 57, and 58 are visible and thus accessible by the cursor 50. Icon 57 is said to be highlighted. The file name 34 of icon 56 is located directly below the icon; this position is called a field. The window title 65 is shown on the top center of the window rectangle region and is another field. The cursor pointer 50 is currently over icon 57 and the cursor pointer has been activated by a depression of the mouse key. It is appreciated that there are several other ways of activating the cursor pointer which have been discussed already above. When the cursor 50 is activated, the icon 57 is said to have been selected and therefore is highlighted by the display system. Icon 57 is therefore highlighted, that is, displayed in a visibly distinct manner with respect to the other icons. The window select region 74 is located in the upper left hand of the window 60. The computer will close window 60 when the cursor 50 is moved on top of the region 74 and the cursor is activated. When the window 60 closes it is removed from the desktop area 20.

Figure 5A:
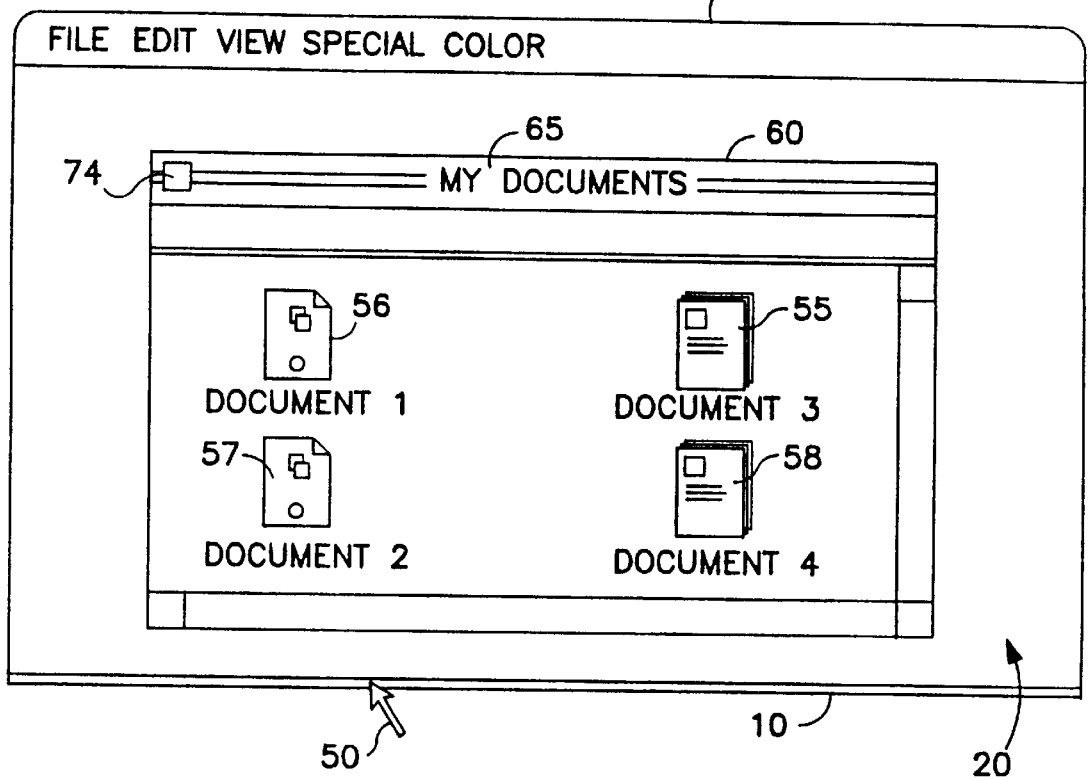
FIG. 5a is an illustration of Desk Drawer closed with the cursor pointer on the drawer handle bar to open.

Refer to FIG. 5a which shows the Finder™ environment and the preferred embodiment of the Desk Drawer in the closed state. FIG. 5a is substantially similar to FIG. 4a, however icon 57 is no longer selected by the cursor pointer 50 and is displayed in a normal video mode. The important change here is that the cursor pointer 50 has been moved from the window 60 region, downward, to a position on top of the region of the Desk Drawer handle 10, or first triggered display region. It should be understood that FIG. 5a is a freeze frame of the moment just before the Desk Drawer opens since the cursor position triggers the Desk Drawer automatically. FIG. 5a therefore, for clarity, shows the state of the Desk Drawer immediately prior to the Desk Drawer opening. The state of FIG. 5a is thus very transient and the resultant display is seen in FIG. 5b.

The handle 10 region may act as a "hot spot" or an "edge triggered" region and it is appreciated that it may respond to the cursor's position in either fashion. Both methods of invoking action are well known in the art of user interfaces for the Finder™. When the cursor 50 position is moved to the handle 10 region, without more, the computer opens Desk Drawer. When an interface is invoked solely by the cursor's position on the display edge within a specialized display region, this may be referred to as "edge triggering." When the entire specialized region is active (i.e. not just the edge) then such region is called a "hot spot." It is to be appreciated that within the present invention the handle bar region 10 can be utilized as either a hot spot or an edge triggered region. Either method is interchangeable. The specialized display region utilized to open a drawer region in the present invention is called a first trigger display region for first trigger means.

Figure 5B:
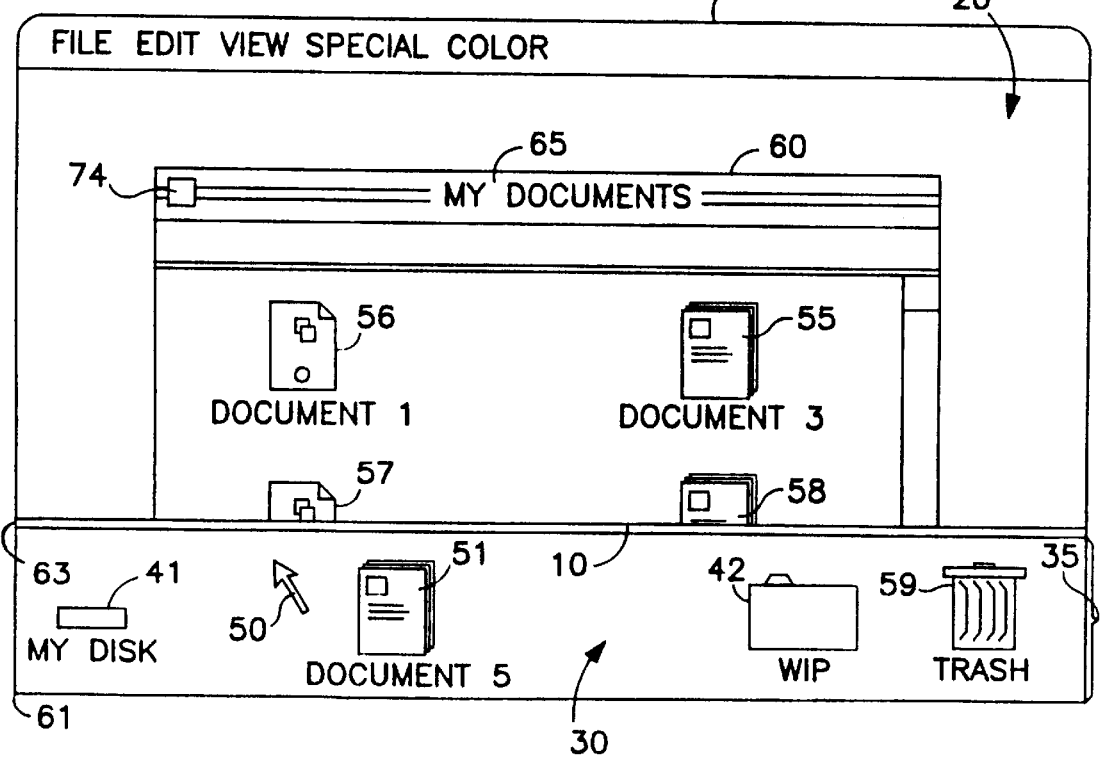
FIG. 5b is an illustration of a display screen on the Finder™ with Desk Drawer open and no icons selected.

Refer to FIG. 5b which represents the state of the present invention just after the Desk Drawer opens fully. Previously the cursor pointer 50 had reached the handle bar 10 region and this triggered the computer to open Desk Drawer. When the Desk Drawer is triggered open, the handle bar 10 quickly and visibly moves or "animates" upward from its closed state on the bottom of the screen display 75. The handle bar 10 moves upward over the desktop region 20 until it reaches a predetermined height 63, a relative distance away from the screen bottom 61. At this point 63 the handle bar remains in a fixed position. Upon the Desk Drawer opening, the rectangular drawer space 30 is revealed along with its contents. The drawer space 30 is rectangular with a width across the width of the display screen 75 and a height predetermined at the position where the handle bar 10 is located 63. The width of the secondary display region may be less than the display width of the display screen 75. When Desk Drawer is open, the handle bar region is now called the "second triggered display region." When the Desk Drawer is open, the drawer space 30 is always visible. The computer will open the drawer space 30 "on top of" any previously visible image on the display screen. For example, in FIG. 5b, the drawer space 30 opens to partially cover the desktop region 20, the window 60, and partially cover the icons 57 and 58 which are inside window 60. As will be further discussed, the drawer space 30 is considered a "window region." Therefore, as would be expected, the drawer space 30 has the attributes of the desktop of the Finder™ user interface.

Referring still to FIG. 5b, the Desk Drawer is open and the drawer space 30 is visible. As with all windows, when the drawer space 30 is visible, the contents of the Desk Drawer are accessible by the cursor pointer 50. Also, since the drawer space 30 opens "on top of" all other items displayed in the screen or subsequently placed on the screen, the icons within the drawer space will always be visible and accessible when the computer opens Desk Drawer to reveal the drawer space 30. Generally, icons are not accessible unless visible on the display screen. It is advantageous, therefore, that all icons within the drawer space 30 will always be accessible, i.e. visible, when the Desk Drawer opens. Within the drawer space 30, are visible icons 41, 51, 42, and 59. These four icons have been previously placed within the Desk Drawer (see below for placement mechanism) and were hidden from view when the Desk Drawer was closed. It should be noted that icon 42 represents a folder, and may be viewed as a closed window; if icon 42 was selected by the cursor pointer 50 and activated, icon 42 would open to resemble the general display format of window 60 outside the drawer.

The position of cursor pointer 50, in FIG. 5b, is an important aspect of the open drawer space 30. When the processing logic opens Desk Drawer, the cursor pointer 50 does not move from its original position but rather remains in the same position it occupied when it edge triggered the Desk Drawer to open initially. That is, the cursor pointer 50 position remains in the bottom region of the screen where the handle bar 10 existed when the Desk Drawer was closed. The cursor pointer 50 is free to move about the entire drawer space 30. Indeed, while within the drawer space 30, the cursor pointer 50 has all the normal capabilities it possesses while in a typical Finder™ window or the desktop. For example, while within the drawer space 30, the cursor pointer 50 may among other things, select or highlight an icon, or it may drag a previously selected icon to a new position, or it may invoke an application program represented by a selected icon.

The preferred embodiment, Desk Drawer, remains open while the cursor pointer 50 is free to move about the drawer space 30. Refer to FIG. 5b. The term, "drawer region" 35, refers to the display region comprising both the drawer space 30, also referred to generally as the secondary display region, and the handle bar region 10, now called the second triggered display region. As shown by FIG. 5b, only the height of the drawer region is shown by point 35; but it is to be understood that the drawer region is two dimensional having a width of the display screen 75. Therefore, while the cursor pointer 50 remains within the drawer region 35, the processing logic will not close Desk Drawer and the present invention will remain in its open state with drawer space 30 accessible.

The processing logic immediately reverts Desk Drawer back to the closed state when, without more, the cursor pointer 50 moves outside the drawer region 35. For instance, referring to FIG. 5b, the cursor pointer 50 is shown in its original position that edge triggered the Desk Drawer opening. If the cursor pointer 50 is caused to move upwards towards the top of display screen 75, it will eventually reach the region of the handle bar 10. When the Desk Drawer is open and the cursor pointer 50 reaches handle bar region 10, now the second triggered display region, there is no automatic edge triggering of the Desk Drawer like there was when the Desk Drawer was closed. That is, the automatic edge triggering mechanism of the Desk Drawer for the handle bar region 10 is deactivated when the Desk Drawer is already open. However, if the cursor pointer 50 moves out of the region of the handle bar 10, away from the drawer space 30, then it is said to have left the drawer region 35. When the cursor pointer 50 leaves the drawer region 35, the computer automatically closes Desk Drawer without more. In other words, the mere act of the cursor pointer leaving the drawer region 35 is enough to edge trigger the closing of the Desk Drawer in the normal mode of Desk Drawer operation. It should be appreciated that other mouse and/or keyboard commands may be effectuated to close the Desk Drawer. However, in the normal operation of the present invention the cursor pointer 50 position edge triggers the Desk Drawer close. When the computer closes Desk Drawer, the position of the cursor pointer 50 remains constant.

Figure 6:
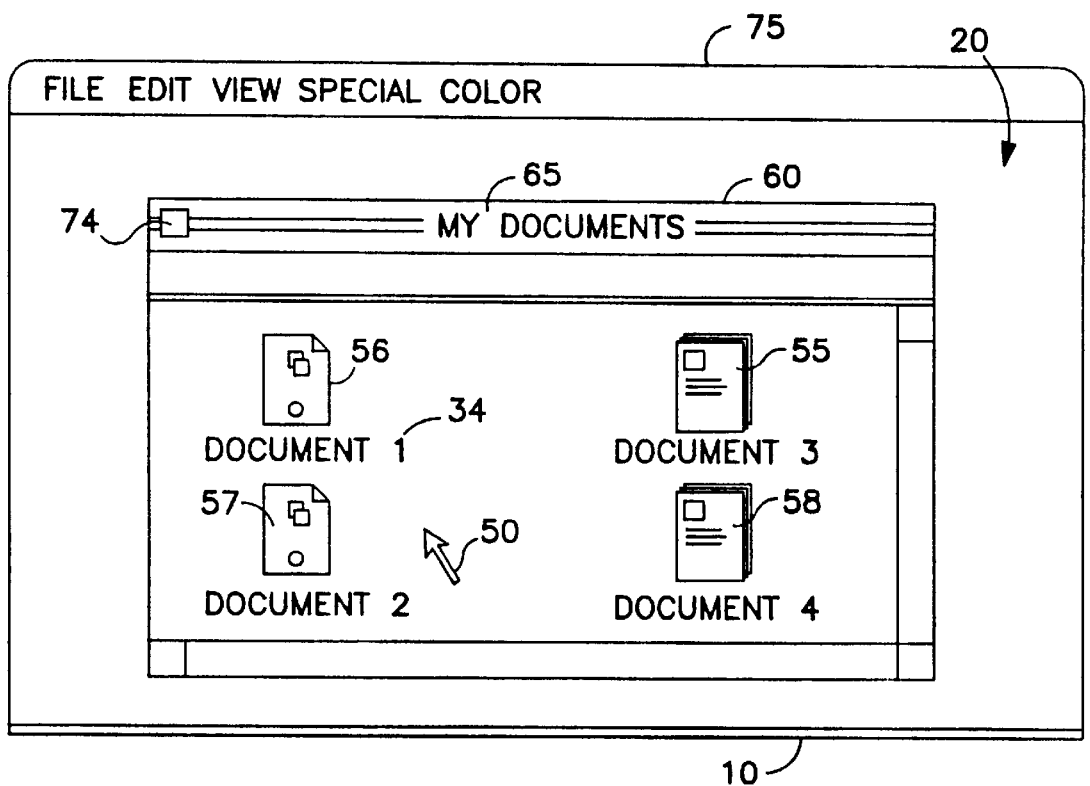
FIG. 6 is an illustration of a display screen on the Finder™ with the Desk Drawer closed and no icons selected.

Referring to FIG. 6, the computer closes Desk Drawer by quickly and visibly "animating" the handle bar 10 downward thus reducing the drawer space 30 until the draw space 30 and its contents are not visible anymore. At this point the icons (41, 51, 42, 59) within the drawer space 30 are temporarily not accessible. The handle bar 10 is the only visible portion of the Desk Drawer when closed. As shown in FIG. 6, the cursor has just left the portion of the screen that contained the drawer region 35 and entered the window region of window 60. This event causes the Desk Drawer to close, leaving the cursor pointer 50 in the that position where the cursor pointer 50 just exited the drawer space 30. In this closed state, the handle bar 10 is again active, called the first triggered display region, and will open the drawer if the cursor pointer 50 edge triggers the bar 10 space or "hot spot."

The above describes the basic operations of opening and closing the preferred embodiment of Desk Drawer to allow access to the contents of the drawer space 30. It was mentioned that the Desk Drawer should be viewed as an extension of the desktop and that further the Desk Drawer operates in much the same manner as a typical window. Therefore, the Desk Drawer interface allows the user to easily transfer information (files) between the drawer space and other windows or the desktop environment. Refer to FIG. 4a which was described earlier. It illustrates the cursor pointer 50 over the icon 57. The icon 57 is currently highlighted, or "selected" by the cursor which is shown activated. In this selected state, the computer will move icon 57 by the corresponding movement of the cursor pointer 50. This movement of the icon 57 with the cursor pointer 50 is referred to as "dragging." Thus, the icon 57 is said to be "dragged" by the cursor pointer 50. When the icon 57 is dragged to the desired position on the screen, the user may drop the icon via the cursor device 82, 83 (FIG. 2). Once the icon 57 is dropped it will remain in that position until moved again by the cursor device 82, 83. Therefore, by using the mouse device (which is only one of many ways to effectuate movement of the cursor pointer 50) the user can easily move icons around the screen from their initial position to different or target positions.

The effect of moving an icon from one visible screen location to another visible screen location is to have the computer transfer (or copy) the information representing by the icon to different places within the information management system. For instance, an icon may be moved around in the region of a single window, or an icon may be moved from one window region to another window region, or an icon can be moved between a window region and the desk top. If an icon is moved from one window space to another window space, then that icon is graphically transferred to the new window and graphically removed from the old window. In this fashion the user interface allows information (files) to be easily moved or copied to different locations within the information management system.

Figure 4B:
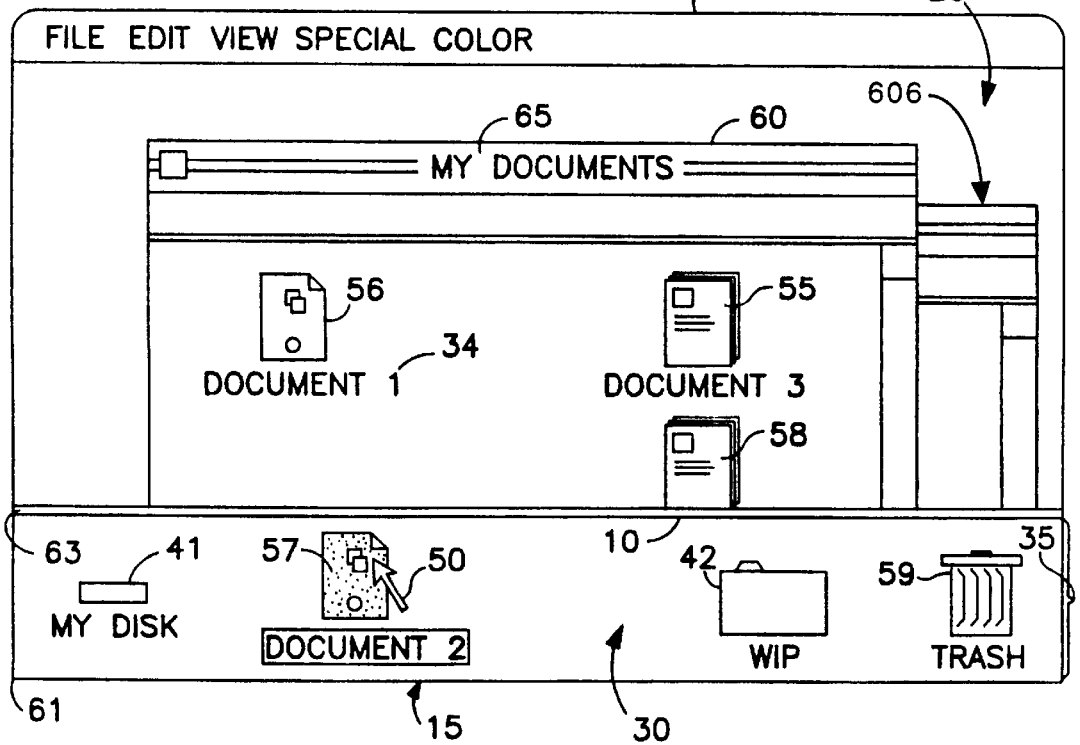
FIG. 4b is an illustration of an information management system having a center window open with icons and Desk Drawer in an open state. The cursor means is used to open and place a document into the Desk Drawer.

Since the drawer space is similar to a typical window space, icons may be easily moved into and out of the secondary display region, or desk space, of the present invention. FIGS. 4a and 4b illustrate one method of transferring information from a window 60 to the drawer space 30 of the Desk Drawer. Refer to FIG. 4a. The cursor pointer 50 is placed over the desired icon 57 and the cursor device is activated thus highlighting and selecting the icon 57. The icon 57 can then be "dragged" by the movement of the cursor pointer 50. The user must open the Desk Drawer interface in order to place the icon 57 into the drawer space 30; however at present Desk Drawer is closed. In order to place the icon 57 into the drawer space 30, Desk Drawer must be open. The user drags the icon 57 (and cursor pointer 50) from its initial position downward toward the handle bar 10. While the cursor pointer 50 is dragging the icon 57 it is still active to edge trigger the handle bar 10 on the hot spot. Therefore when the position of the cursor pointer 50 (with the associated dragged icon 57) reaches the handle bar region 10, the computer opens Desk Drawer to the predetermined height. As long as the cursor pointer 50 remains within the drawer region 35, the Desk Drawer remains open.

The resultant effect of placing an icon 57 into the drawer space is shown by the illustration of FIG. 4b. The Desk Drawer interface is shown open by the computer, with the drawer space 30 existing partially over window region 60. Also, icon 57 is shown highlighted within the drawer space 30. Since the cursor pointer 50 was dragging icon 57, icon 57 will show in the foreground, in front of the drawer space 30. To complete the transfer of icon 57 from window 60 to the drawer space 30, the user simply drops icon 57, via the cursor device, once icon 57 has been dragged within the drawer space 30. Once dropped by the cursor means, icon 57 will appear as a new addition to the drawer space 30; and icon 57 will no longer exist within window region 60. The Desk Drawer interface will remain open while the cursor pointer 50 remains within the drawer region 35. When the cursor pointer 50 moves outside the drawer region 35, the computer will close Desk Drawer and icon 57 will no longer be visible as the drawer space 30 closed and further since icon 57 was previously moved outside of the visible window region 60. Icon 57 will be accessible only when the Desk Drawer is open and drawer space 30 is visible again. It is to be appreciated that within the preferred embodiment file transfer may be effectuated from any accessible region of the Finder™ environment (including the desktop region) to the Desk Drawer; and that further, transfer from the open window 60 is described merely as an example of this feature of the present invention.

The preferred embodiment of Desk Drawer allows icons to be easily "removed" from the drawer space 30 and placed into another window, or alternatively, some other section of the desktop region 20. Assume for the next two sentences that Desk Drawer is closed and the user wants to remove an icon 57 from the drawer space 30 and transfer the icon 57 into the currently open window 60 region. The cursor pointer 50 is moved to the handle bar 10 causing the computer to open Desk Drawer. Refer to FIG. 4b. The contents of Desk Drawer are visible and accessible. The cursor pointer 50 highlights or selects the target icon 57 as shown in FIG. 4b. The cursor pointer 50 "drags" the selected icon 57 away from the drawer space 30; here dragged upward until the cursor pointer 50 leaves the outer most portion of the drawer region 35. When the cursor pointer 50 exits this region (the secondary display region), the computer closes Desk Drawer leaving the highlighted icon 57 and the cursor pointer 50 in the same display position that edge triggered the closing; as shown the edge trigger position is within the open window 60 region. The other icons 41, 42, 59 within the drawer space 30 are no longer accessible since the Desk Drawer has closed. Referring to FIG. 4a, the icon 57 and cursor pointer 50 would then be within the open window 60 region. At this point, icon 57 and cursor pointer 50 can be dragged anyplace within the desktop environment; notice icon 57 is still selected. FIG. 4a illustrates the display when the icon 57 is dragged into the lower left corner of window 60. Next, FIG. 6 illustrates the display when icon 57 is dropped and thereby placed into window 60. Desk Drawer is shown closed. This procedure completes the transfer of the icon 57 from the Desk Drawer to the widow 60. It is to be appreciated that file transfer may be effectuated from the Desk Drawer to any accessible region of the Finder™ environment (including the desktop region); and that further, transfer into the open window 60 is described merely as an example of this feature.

It is important to note that icons may NOT open into windows within the drawer space, but rather open onto the desktop 20. Icons representing closed windows may be placed into Desk Drawer (secondary display region) in the usual fashion as described above. If an icon representing a closed window ("folder") were placed into the drawer space 30 it would appear in the same manner as it appeared outside the drawer space 30. However, the folder within the drawer space 30, when opened, may not open into the drawer space as an open window. Rather, the folder will open onto the desktop region 20 in its predetermined position. If this predetermined position happens to be in the same screen position of the still open drawer space 30, then the drawer space 30 will partially cover the window and the window will thus be partially accessible. When the computer closes Desk Drawer the window will be fully accessible to the user. In addition, once the window closes, it would "zoom down" to the handle bar which is symbolic of the fact that the Desk Drawer is the origin of the window. It is important to realize that windows do not open in the drawer space 30 because of the size constraints of Desk Drawer. Further, the present invention was designed in part to solve the problems of icon accessibility and window overlap which may be thwarted by full sized windows within the drawer space 30.

Open windows on the desktop 20 may be dragged or placed into the drawer space 30 of the present invention, but they undergo a transformation. Specifically, one such possible transformation is described below. The open windows when placed into the drawer space 30 do not remain in full size. Upon being placed into the drawer space 30, the open windows undergo a shrinking process whereby they compress from their normal display size to a size roughly the size of two icons in area. At this point the compressed window or "thumbnail" window is allowed to enter the drawer space 30. Thumbnail windows may not be accessed for their contents, but serve only a display function. Part of the thumbnail window may be undiscernible because of the compression, however other parts may still be recognizable. The contents of a thumbnail windows are updated, if appropriate, in real time. The important aspect of the thumbnail window is that the window is for display only and the normal accessing capabilities of the window are temporarily shut off (i.e. the contents of a thumbnail window may not be edited in this state). To regain access to the window and its contents, it must be dragged or placed out of the drawer region 30 and placed back out in the other Finder™ environment. In the process of dragging the thumbnail window out of the drawer space 30, it will automatically "regain" its normal size and functions.

The present invention functions to enhance and facilitate utilization of other common interfaces of the Finder™ environment; an illustration is shown where Desk Drawer enhances access to the trash can 59 utility. A common use of Desk Drawer is to place the "trash can" icon 59 into the drawer space 30. This allows facilitated access to the trash can 59 when other windows are open on the display screen 75 that may cover the trash can 59 if located in the desktop area. For instance, assume the icon 57 as displayed in FIG. 4a is to be discarded. The cursor pointer selected icon 57 as shown, then the icon 57 is dragged downward such that the cursor pointer 50 touches the handle bar 10 thus opening the Desk Drawer. Refer to FIG. 4b. The trash can 59 is now accessible and icon 57 is still highlighted. The icon 57 is further dragged horizontally until it reaches the trash can icon 59. Icon 57 enters the trash can 59 when the cursor pointer is deactivated by the cursor device 82,83. If there had been an obstructing window open in the lower right hand corner of the display screen 75 it would cover that portion of the screen. If the trash can 59 were located merely on the desktop then it would also be covered by this obstructing window and therefore not accessible. The obstructing window would have to be closed or moved before the trash can 59 could be utilized. However, if the trash can 59 is placed in the Desk Drawer, it would be constantly accessible when the Desk Drawer opens; this is true since the drawer space 30 opens "over" any other window on the display screen 75. Accordingly, in order to insert icon 57 into the trash 59, the obstructing window need not be closed or moved since the drawer space 30 would open over the window. In fact, using the advantageous features of the present invention the window is no longer "obstructing" at all. Desk Drawer may similarly enhance the utilization of other programs and interfaces within the Finder™ environment.

For purposes of clarity and example only the preferred embodiment of the present invention is described as situated on the bottom of the screen display 75. It is to be appreciated that Desk Drawer may be situated on any side of the display screen, left, right or on the top. The user may select the placement of the Desk Drawer by option command. In these instances, for example the "left" hand side, the handle bar, first triggered display region, would exist vertically on the left side of the display screen 75. In this left hand position all data access, transfer and other features of Desk Drawer would remain substantially constant. When the computer opens the drawer space 30, in this left position, instead of animating upward from the bottom, Desk Drawer would animate outward from the left to occupy a region on the left side of the screen. Likewise, if the handle bar 10 was selected on the screen top, the computer would animate the drawer space 30 downward to a predetermined position when the top handle bar 10 was edge triggered by the cursor pointer 50.

Figure 7A:
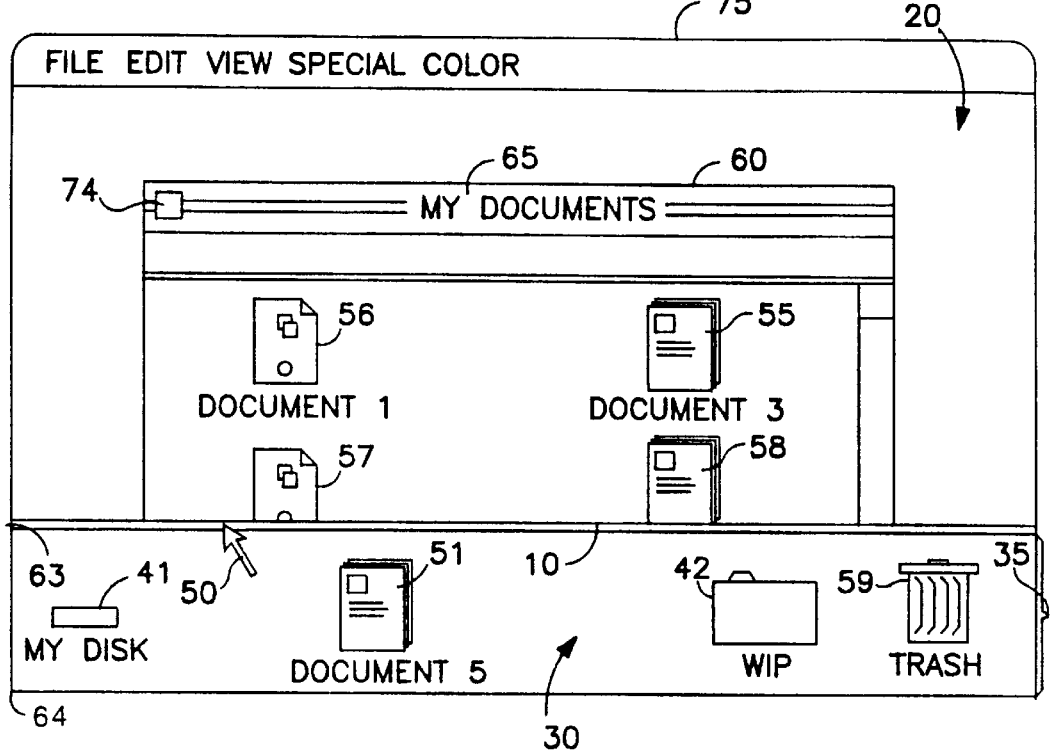
FIG. 7a is an illustration of Desk Drawer with the cursor pointer selecting the Desk Drawer handle bar.
Figure 7B:
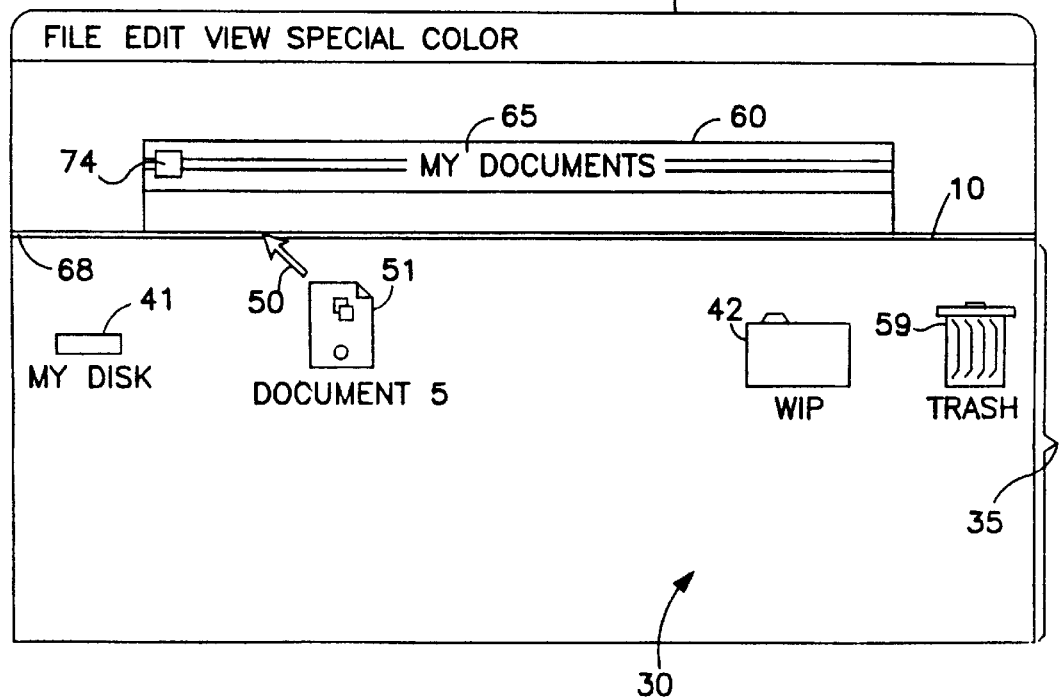
FIG. 7b is an illustration of the Desk Drawer after having adjusted the Desk Drawer using the handle bar.

The size of the drawer space 30 is variable within the preferred embodiment. The drawer space 30, or secondary display region, is initially set to a default size which is substantially 20% of the total screen display area; FIG. 7a represents the default size and these relative proportions are well illustrated therein. When Desk Drawer is open, the present invention allows the size (visible area) of the drawer space 30 to be adjusted by user control. Referring to FIGS. 7a and 7b, in this fashion, the predetermined height 63 of the handle bar 10 can easily be adjusted to provide a custom environment for the user. When Desk Drawer is open the current handle bar region is also called the second triggered display region. To adjust the drawer space 30, the Desk Drawer must be open. In FIG. 7a, the Desk Drawer is shown open with the cursor pointer 50 located on the handle bar region 10, second triggered display region. In order to expand the drawer space 30, the cursor device activates the cursor pointer 50 when the pointer is located in the handle bar 10 region. In many instances the activation is accomplished by pressing down the mouse button 83. While activated, the cursor pointer 50 is then moved upward by the cursor device. See FIG. 7b. This upward movement causes the handle bar to be "dragged" upward thus revealing more accessible drawer space 30. The icons in the drawer may also move upward by an equal amount. When the handle bar 10 reaches the desired height 68 the cursor pointer 50 is fixed and deactivated. Now, the new handle bar 10 position is set to the adjusted position 68. It is appreciated that when the additional drawer space 30 is revealed, it opens on top of any other elements in the display screen. This is because the additional drawer space has all the attributes of the original drawer space 30; the icons in the drawer would normally move upward with the handle bar 10. FIG. 7b illustrates the resultant view when the handle bar 10 is moved to a new predetermined height 68. As shown, more of window 60 is covered by the additional drawer space than previously covered in FIG. 7a. In this example the new drawer region 68 is roughly three times the area of the previous region 63. New icons (files) can be placed into this larger drawer region 68. The present invention does not provide for an upper limit restricting the height of the adjustable handle bar 10, second triggered display region. However, the display screen 75 top is an inherent limit.

This adjusted height 68 of FIG. 7b will be automatically set into the Desk Drawer so that subsequent access to the Desk Drawer will cause the computer to open the drawer space 30 to that new predetermined height 68. For example, when the cursor pointer 50 leaves the drawer space 30 the Desk Drawer will close. When opened again, the handle bar 10 will animate upward to the last adjusted height, or in this example, to the new height 68.

The drawer space 30 can also be adjusted smaller than the default size 63. The mechanism of the preferred embodiment for reduction is similar to that of the enlargement mechanism, as just discussed. Accordingly, to shrink the drawer space 30, the cursor pointer 50 rests within the handle bar 10 region and activates the handle bar 10. The cursor pointer 50 then "drags" the handle bar 10 downward, reducing the size of the drawer space 30 while uncovering previously hidden desktop elements. Referring to FIG. 7a, if the Desk Drawer were reduced in size, the drawer space 30 would shrink, the predetermined height 63 would move closer to the bottom (for example point 64) of the display screen 75, and more of window 60 would be revealed. When the desired position was reached 64, the cursor pointer 50 is fixed and deactivated to set the new height 64 into place. As before, this new height 64 would be set for future access into the Desk Drawer. It is appreciated that if the new drawer space 30 height 64 should be smaller than the height of an icon within the Desk Drawer, then that icon will be only partially visible in the drawer space 30.

The present invention may become deactivated by reducing the drawer space 30. If the drawer space 30 is reduced completely, that is, if the handle bar 10 is dragged to the bottom of the screen display 75 to the closed position, then the Desk Drawer is temporarily deactivated. This is so because when the handle bar 10 is at the bottom of the screen, drawer space 30 is no longer visible. Since no drawer space 30 is visible, none will be accessible and the present invention is effectively "switched off" since the icons within the drawer space 30 (secondary display region) are not accessible. This is a convenient method of temporarily deactivating the preferred embodiment. While the handle bar 10 is in this state, icons of the drawer space 30 are temporarily not accessible. It is appreciated that when deactivated in this manner, the present invention is still operating and the handle bar 10 remains accessible to the user. Therefore, using the enlargement technique described above, the user may easily "switch on" the Desk Drawer by dragging the handle bar 10 upward once again to create a useful sized drawer space 30.

Figure 8:
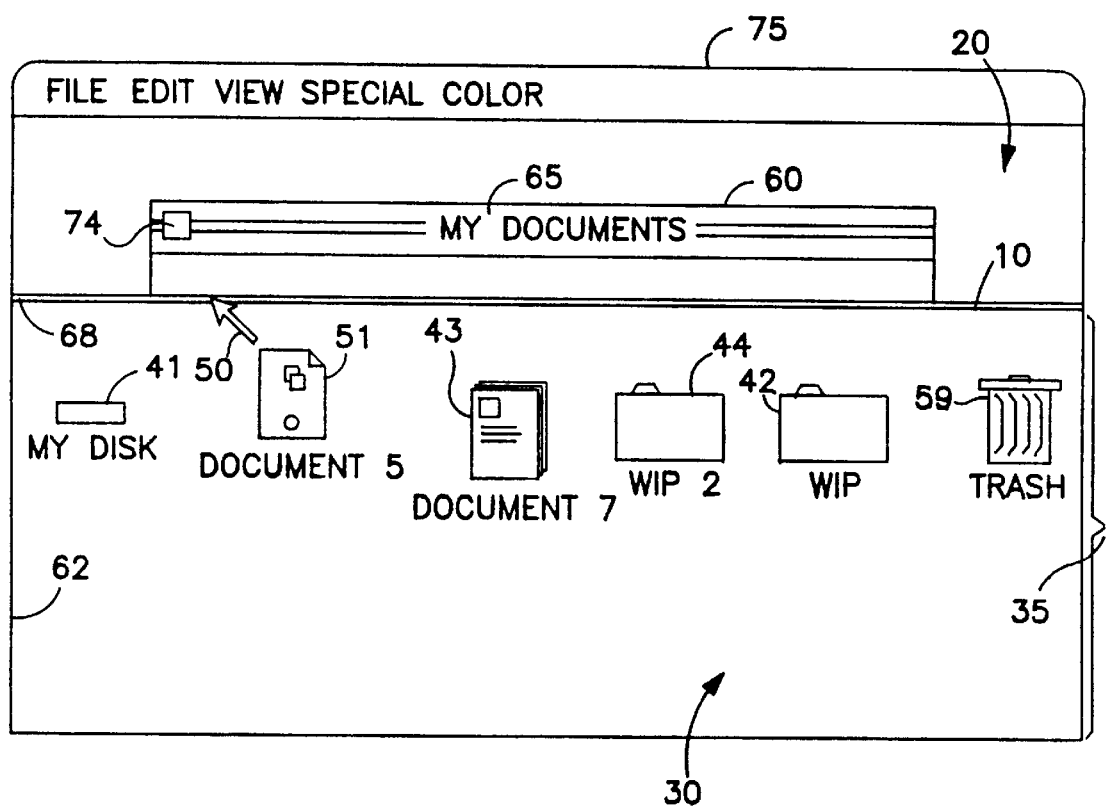
FIG. 8 is an illustration of an expanded Desk Drawer with icons spread throughout the drawer space.

Refer to FIG. 8. When reducing the drawer space 30 by dragging the handle bar 10 downward, icons within the drawer space will be displaced by an equal amount and direction so that they do not become covered by the displaced handle bar 10. This displacement will continue until the icon reaches the appropriate screen edge where they become "pinned" to the edge; at this point further handle bar 10 displacement will cause only unpinned icons to be displaced while the pinned icons remain fixed against the screen edge. It is appreciated that as the secondary display region shrinks, the icons will maintain their distance from the handle bar 10. For instance, Desk Drawer is shown open about 33% of the display screen. As the handle bar 10 descends, icons 43 and 44 will descend in conjunction with the handle bar movement while maintaining as constant their distance with the bar 10. All icons within the secondary display region move down until they reach the edge of the screen where they will pin. As the drawer is closed further, eventually the handle bar will reach the icons pinned at the edge of the screen. The icons now pin against the handle bar. When the handle bar 10 is displaced (dragged) downward further, the icons 41, 51, 43, 44, 42, 59, which are pinned against the handle bar 10, will be partially obscured from the edge of the visible screen 75. Therefore these icons will be partially visible. However, an individual icon will still be accessible as long as a portion is still visible. Eventually if the handle bar 10 is displaced to the extreme downward position, the icons and the drawer space 30 will no longer be visible nor accessible and Desk Drawer becomes temporarily deactivated. This process reverses then the drawer is expanded.

If after reducing the drawer space 30, the handle bar 10 was dragged open again to position 68 of FIG. 8, then the two icons 43 and 44 would return to their original positions. As they ascended they would maintain, as constant, their distance from the handle bar 10. Therefore, it is a feature of the present invention that icons displaced by the closing handle bar 10 will revert to their initial positions once the drawer space 30 is enlarged to accommodate their original positions.

Also, it is a feature of the present invention to prevent icons from being dragged off the visible display edge when the drawer space 30 is open. Refer to FIG. 4b. For instance, the Desk Drawer is open and icon 57 has been selected. At this stage the icon 57 will be dragged according to the movement of the cursor pointer 50. The cursor device may direct the cursor 50 to drag the icon 57 downward until the lower portion of the icon reaches the bottom edge 15 of the drawer space 30. At this point the icon 57 will no longer move downward, but stay "pinned" on the bottom edge while the cursor pointer 50 is free to move downward until it reaches the bottom edge point. When both icon 57 and cursor pointer 50 reach the bottom edge 15, then no further edgeward movement is allowed; the icons may become only partially hidden. Contrast this procedure with that of a closing handle bar 10, as discussed above in which the closing action may cause drawer space icons to become substantially or fully covered when the drawer space height decreases below that of the icon height.

The present invention stores the lateral positions of icons placed within the Desk Drawer as relative positions with respect to the width of the display screen 75. That is, each icon's lateral position is, in fact, normalized to that of the available screen width for a particular computer screen. The information is stored according to the following equation:

Icon_Lateral_Pos=(Display_Pos)/(Total_Physical_Screen_Width1).

Where the Display_Pos represents the numeric value of the actual lateral position of the icon on the screen and Total_Physical_Screen_Width1 represents the numeric value of the width or height of the display screen 75. This value will change depending on the screen display utilized. Icon_Lateral_Pos is the numeric value recorded by Desk Drawer. This is advantageous because if the display screen width should change, (because Desk Drawer is operated on different systems) then the stored relative positions of the icons can easily be translated into actual display positions on the new screen by the following equation:

Display_Pos=(Total_Physical_Screen_Width2)*Icon_Lateral_Pos.

Where Display_Pos is the new lateral display position of the icon. Total_Physical_Screen_Width2 is the width of the new computer display screen and Icon_Lateral_Pos is the same stored value in Desk Drawer as previously calculated from the first equation.

The present invention features many advanced methods of interfacing with the user. As already described, the cursor means may open a closed Desk Drawer by merely placing the cursor pointer 50 on the handle bar 10 region. However, the present invention also allows the user to effectuate Desk Drawer by several other means. One means is to move the cursor through the handle to the edge of the screen, called "edge triggering." Another means of opening requires both cursor pointer 50 position on the handle bar 10 region and simultaneously a depression (click) of the cursor button 83. This is called the "mouse down" operation. It is noted that when in this mode of operation, the Desk Drawer may open still when the user drags an icon to the handle bar 10 region; this is because the act of dragging requires the mouse button to be depressed anyway (clicked down). This separate method of opening Desk Drawer is selected via a command menu similar to that illustrated in FIG. 3. The present invention also readily interfaces with the keyboard 81 such that cursor position and activation may be effectuated by pressing keys 86 or other predetermined key sequences. It is to be appreciated that the present invention fully accepts input from the Easy Access system specially developed for the physical handicapped. Easy Access is also referred to as "disabled access." Using Easy Access, Desk Drawer may accept a variety of cursor position movement (such as use of the keypad numbers 87) and activation commands from the keyboard or other specially adopted user input devices also accepted by Easy Access. It is to be appreciated that when Desk Drawer is under keyboard control the position of the cursor pointer 50 no longer primarily controls the opening and closing of the Desk Drawer. Therefore, when in a keyboard access mode, Desk Drawer may open and close by special keyboard sequence commands, regardless of the location of the cursor pointer 50. Accordingly, the cursor pointer 50 may be outside the drawer space 30 and the Desk Drawer will remain open until a closing command sequence is received from the user input device.

When a window in the desktop environment closes, a rapid animation display image takes place called "zoom down." In "zoom down" the closing window is quickly removed from the screen and a series of shrinking window outlines is displayed on the screen in succession giving the "effect" of the window closing and reverting into its place of origin. The entire process is over well within a few seconds. The present invention, Desk Drawer, also provides this feature for icons located within the drawer space 30. That is, when an open icon residing within the Desk Drawer is closed, the closing window will "zoom down" with the animation outlines directed toward the location of the handle bar 10 region. This gives the effect of the icon returning to the Desk Drawer after being closed.

The present invention as described above has been illustrated with merely one drawer space 30 for the objectives of clarity and simplicity of discussion. However, the single drawer space 30 condition is merely the basic operational level of the Desk Drawer. The present invention is not limited to one drawer space 30, but rather, allows for "multiple drawer spaces" to be accessible to the user; this advanced capability is accomplished by providing multiple handle bar regions.

In the physical sense, multiple drawer spaces may be understood as multiple partitions of an office desk drawer. Or alternatively, multiple drawer partitions may be viewed as multiple levels of the side drawers of an office desk. Each partition is individually accessible to the user. Therefore, different items can be placed within different drawer space partitions. However, like the side drawers of an office desk, only one drawer space 30 is accessible to the user at any one given time when the Desk Drawer is open. To this extent, multiple drawer partitions may not be simultaneously accessible to the user. Although the drawer space partitions may not be simultaneously accessible, information is still readily transferable between the partitions. It is to be further appreciated that a multiple drawer space partition possess the same capabilities and features as a single drawer space 30.

Specifically, Desk Drawer multiple drawer space partitions ("drawer space partitions") are described in further detail. Refer to FIG. 9a which illustrates Desk Drawer in the closed state with four separate closed drawer space partitions. Multiple drawer space partitions require multiple handle bars since each partition is independently accessible. Therefore, the normal handle bar has a new appearance as illustrated by the segmented handle bar 18. It is appreciated that the handle bar segments may be colored or labeled textually or otherwise set apart to further distinguish each from the others. Handle bar 18 has been divided into four separate and active regions (handle bar segments 92, 94, 96, 98) each of which are independent and individual "hot spots" or edge triggered regions. Segment 94 may be called the single first triggered display region while segment 98 may be called the alternate first triggered display region.

Referring to FIG. 9a, for purposes of illustration there are four drawer space partitions described. It is appreciated that a number of different drawer space partitions is possible, from zero to at least 10. When the value zero is selected then Desk Drawer is temporarily deactivated since no drawer spaces are defined. When one partition is selected then Desk Drawer operates in the basic or single drawer space level. The user may select this number and set Desk Drawer to the desired number of drawer space partitions (0 to 10 or more) via a menu command similar to that illustrated in FIG. 3. Referring now to FIG. 9a, the handle bar 18 of the Desk Drawer interface is broken down into four separate sections 92, 94, 96, and 98. Each segment of the multiple handle bar 18 represents a different and individual drawer space. The whole handle bar 18 is evenly divided in width according to the number of segments selected; therefore each individual segment is equal in width with respect the others. For example, if the user selected 8 drawer space partitions then handle bar 18 would be divided into 8 equal regions half as wide as those illustrated in FIG. 9a.

An individual drawer space becomes accessible substantially the same way as the single drawer space Desk Drawer; when the cursor pointer 50 reaches the region containing one handle bar segment (one of 92, 94, 96, 98), then that individual drawer space becomes singularly accessible as the Desk Drawer opens. Refer to FIG. 9a. Each segment of the handle bar 18 is separately edge triggered and simultaneously active. The cursor pointer 50 is located in the region of handle bar segment 94, single first triggered display region, as shown in the illustration. This will cause the computer to open Desk Drawer, and further display the drawer space 36 represented by this segment 94. The resultant open Desk Drawer and drawer space 36 is shown by FIG. 9b. The Desk Drawer opens to reveal the drawer space 36 which is represented by the handle bar segment 94. Within drawer space 36 are the icons 41, 51, 42 and 59 which are now accessible to the user. It is appreciated that different icons may be placed within the other three drawer spaces represented by the other three handle bar segments 92, 96 and 98. In the open state, handle bar 94 is now called the single second triggered display region.

Refer to FIG. 9b. A new feature of the multiple drawer space mode is that other drawer space handle bars (92, 96, 98) remain active and displayed while one drawer space 36 is open. The other drawer space handle bar segments, alternate first triggered display regions, are displayed within the open drawer space. Since the other segments of handle bar 18 are still active, they remain at the bottom of the screen except for handle bar 94. Since handle bar segment 94 was selected it has been removed from the screen bottom and replaced by an empty block between segment 92 and segment 96. Since the Desk Drawer opened, handle bar 94 now exists on the top of the drawer space 36 with the full width of the display screen 75 as a second triggered display region. It is appreciated that the drawers may be narrower than the full width of the display screen, for example, the width of the handle segment associated with the drawer. Handle bar 94 has all the normal attributes and capabilities as the handle bar 10 described in the single drawer space 30 level. Accordingly, handle bar 94, second triggered display region, may be used to modify the size of the drawer space 36 area.

It is an important feature of the preferred embodiment of the present invention that only one drawer space of a multiple drawer space system may be accessible at any one given time. The currently open drawer space will close when either the cursor leaves the drawer space region, thus closing Desk Drawer, or when another drawer space is directed open. When another drawer space is directed open by selection of one of the other handle bars, then the current drawer space closes "while" the new drawer space opens, leaving a condition wherein only one drawer space is open at a time.

Figure 9C:
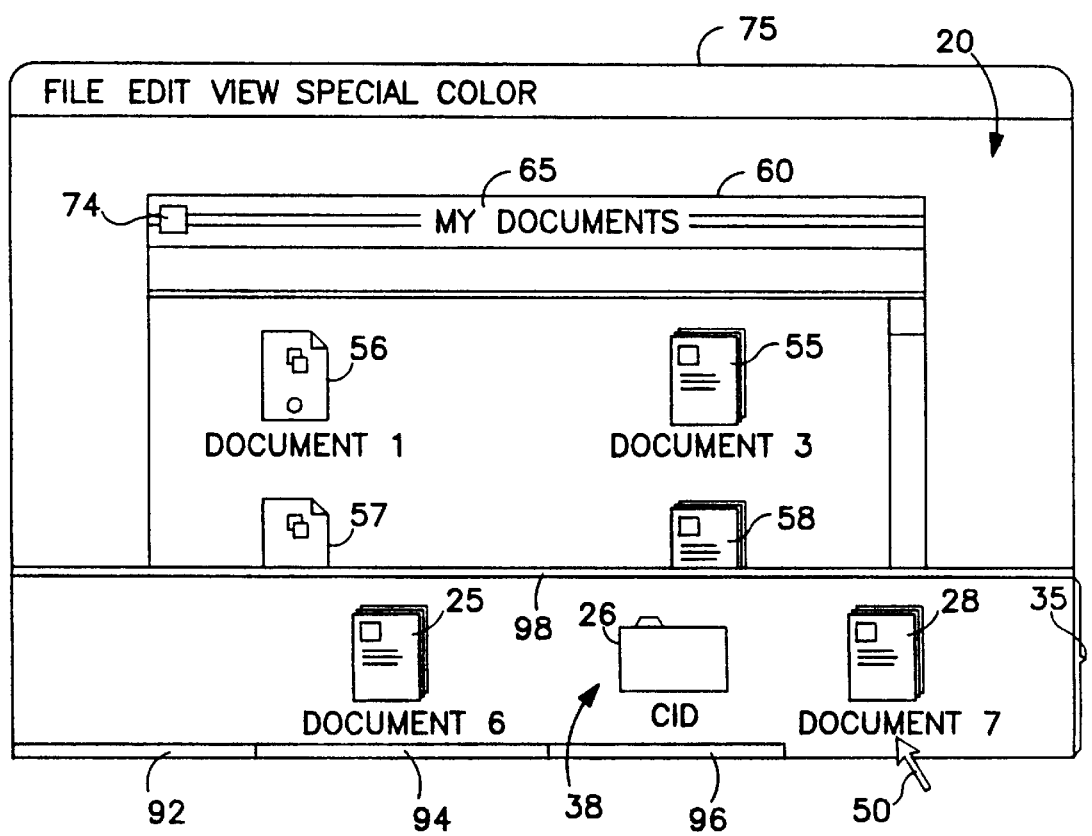
FIG. 9c is an illustration of Desk Drawer open with multiple drawer space handles and another drawer space accessible.

It is appreciated that the other three handle bar segments (92, 96, and 98) remain active. For instance, if cursor pointer 50 is moved into segment 98, the alternate first triggered display region, the following would simultaneously occur: (1) drawer space partition 36 would close, animating downward while (2) drawer space partition 38 opens. It is appreciated that drawer space 36 has closed, but the Desk Drawer has remained in the open state since drawer space 38 was directed open. The resultant display is shown in FIG. 9c. Handle bar segment 94 is again active and visible since drawer space 36 closed and handle bar segment 98 has been removed from the active segments. Handle bar segment 98, now alternate second triggered display region, has become the new handle bar for the open drawer space 38 and is illustrated on the top of drawer space 38. The cursor pointer 50 is shown in the position that previously edge triggered the drawer space 38 to open.

It is appreciated that each drawer space is a separate extension of the desktop and that the drawer space 38 is independent and individualized from drawer space 36. Therefore, the contents of drawer space 38 are different from those of drawer space 36. Drawer space 38 contains icons 25, 26 and 28 which are now accessible to the user via cursor pointer 50. The contents of drawer space 36 being icons 41, 51, 42, and 59. It is also appreciated that the other drawer space partitions (92 and 96) may be accessed in the manner described. If the cursor pointer 50 should leave the drawer region 35 then Desk Drawer would close and the resultant display is shown in FIG. 9a.

Referring to FIG. 9c, in the open state, the cursor pointer 50 could adjust the size of drawer space 38 by using the handle bar 98 dragging technique as previously described. It is an important feature of Desk Drawer that each drawer space partition may be independently adjusted in size. If drawer space 38 is expanded by handle bar 98 then it remains expanded until adjusted othererwise. Drawer space 34 will not be effected by the expansion of drawer space 38 and remains in the default size unless drawer space 34 is itself adjusted. The result is that the present invention offers the advanced capability of having multiple independent drawer spaces which may possess independent size and content while providing access to only one at at time.

Just as files may be easily transferred into and out of a drawer space to the Finder™ environment, files may be easily transferred from one drawer space partition to another without having to first move the files into the primary display region or desktop. Refer to FIG. 9b. Assume icon 42 is to be transferred from drawer space 36 to drawer space 38. In FIG. 9b, drawer space 36 and icon 42 are accessible and handle bar segment 94 is shown open. Cursor pointer 50 may move onto icon 42 and select the icon by depressing the cursor device button 83. While selected, the icon 42 and cursor pointer 50 are dragged down until the cursor pointer 50 reaches the active region of handle bar segment 98 which represents drawer space 38. When segment 98 is reached, simultaneously drawer space 36 closes and drawer space 38 opens. Refer to FIG. 9c. Icon 42 is now effectively removed from drawer space 34 because that drawer space has closed and is not accessible. Since icon 42 was selected, it will remain selected and visible after drawer space 38 opens. The cursor pointer 50 and icon 42 are then dragged to the appropriate position of the currently open drawer space 38 and then dropped by releasing the depressed cursor device button 83. The icon 42 will then become part of the drawer space of drawer space 38; the transfer is complete of the icon from drawer space 36 to drawer space 38.

Figure 10A:
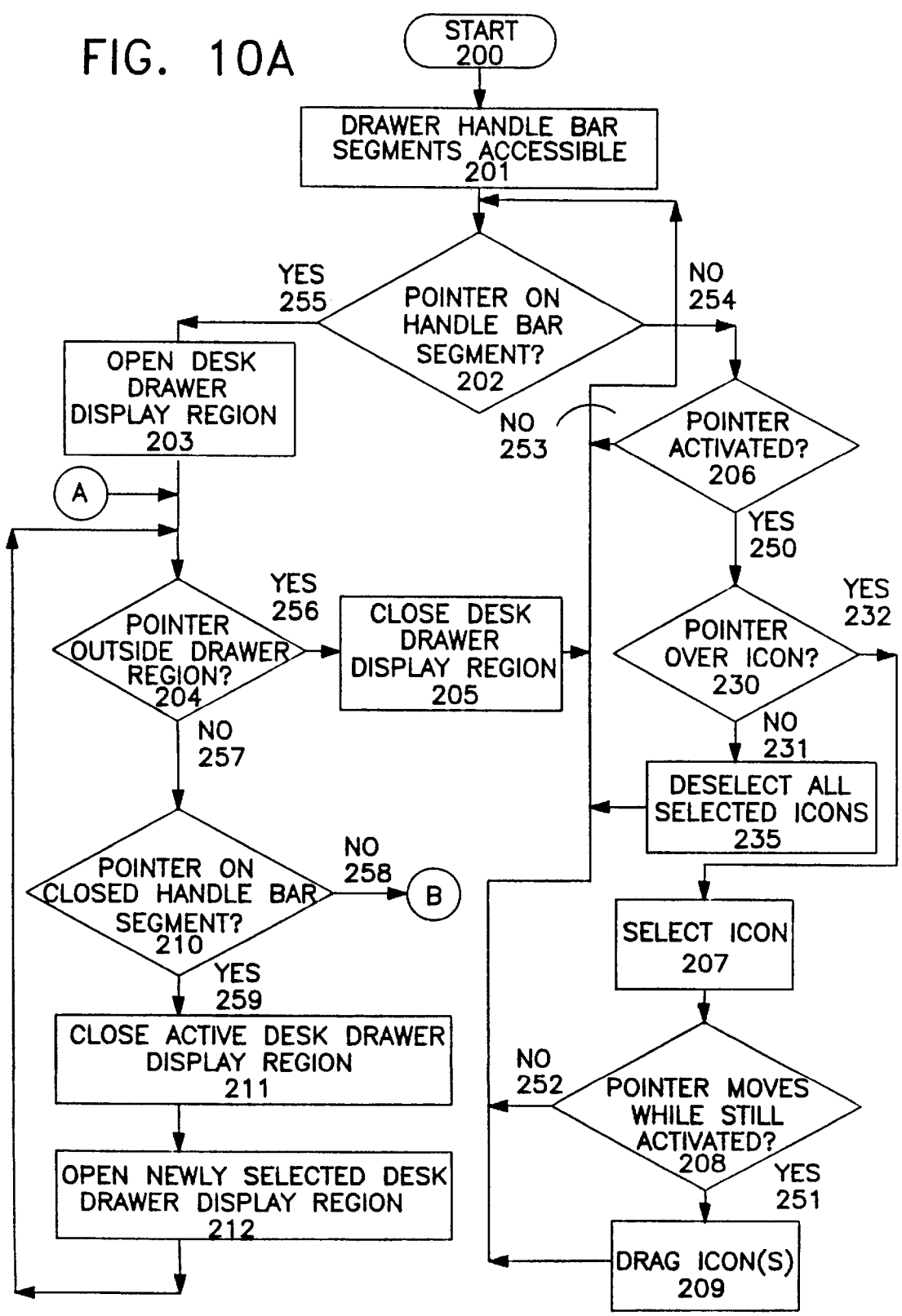
FIG. 10a is a first flow chart of Desk Drawer functions.
Figure 10B:
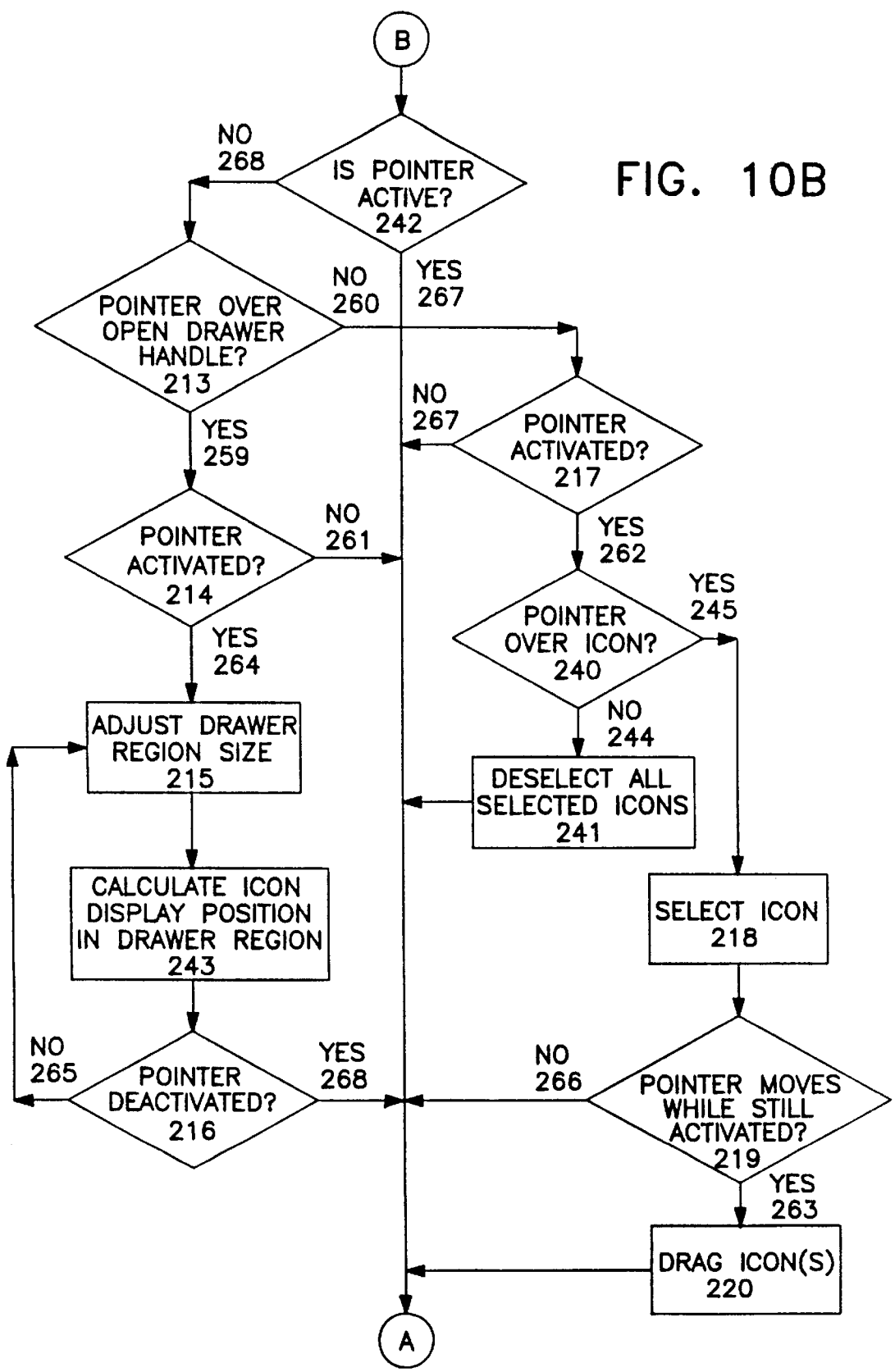
FIG. 10b is a second flow chart of Desk Drawer functions.

FIG. 10a and FIG. 10b illustrate a basic block diagram of the operational computer flow of the present invention. The flow chart serves to illustrate the basic computer "engine" of the present invention. Note that routine cursor movement and Desk Drawer option command access, as shown in FIG. 3, are well known techniques in the art and accordingly are not shown on the flow chart.

Referring to FIG. 10a, the flow chart begins at state 200 with the computer generating Desk Drawer in the closed state and the processing logic displaying and activating the handle bar segments 18, called the first triggered display region. While the drawer is closed, the processing logic at state 202 checks if the pointer is over a handle bar segment. If true then state 203 is entered and if not then the processing moves to state 206 where the processing logic allows the cursor pointer 50 to freely move about the screen location and select 207, drop 235, or drag 209 various icons as shown by states 206, 207, 208, 230, 235 and 209. State 206 checks if the pointer is activated. If not activated then the processing is directed to state 202. If true, then at state 230 the computer checks if pointer is on an icon. If false, then the present icon is deselected at state 235 and processing returns to state 202. If true, the pointer is on the icon and activated, then state 207 is entered. If the icon was not already selected then the icon would become presently selected at 207. At state 208, when the icon is selected while the cursor pointer is moved then the processing is directed to state 209 where the icon is dragged on the display screen. The same is true for state 220. The processing returns to state 202.

Referring still to FIG. 10a. The computer checks if the pointer 50 reaches a bar segment 18 at state 202 (a segment in this form is also called a first triggered display region). If false, the computer returns to state 206. If true, the computer goes to state 203 and opens Desk Drawer to display a drawer region corresponding to the bar segment, first triggered display region, selected. The computer next checks to see if the pointer 50 ventures off the drawer region at state 204. If true, then the computer closes the Desk Drawer by state 205 and returns to state 202. If false, the computer moves to state 210. At state 210 the computer checks to see if the pointer 50 has selected another active bar segment, alternate first triggered display region, from handle bar 18. If true, then the user wants to open another drawer space and the computer simultaneously closes the active drawer space and opens the new drawer space by states 211 and 212 respectively. Then the computer returns to state 204.

Refer to FIG. 10b. If state 210 was false, the computer goes to state 242. If the pointer is active the computer returns to state 204, if not then the computer goes to state 213. At state 213 if the pointer 50 is on the current open handle bar, or also referred to as second triggered display region (on the top usually), then the computer goes to state 214 to check if the pointer is newly activated. If not activated the computer returns state 204. If activated at 214 the computer then adjusts the drawer space size according to the cursor movement by state 215, adjusts the location of individual icons within the drawer as necessary 243, then checks at state 216 to see if the cursor is deactivated. If deactivated, the computer sets the new drawer size and returns to state 204. If not deactivated the computer returns to state 215. At state 213, if the pointer is not on the current open handle bar, then the computer goes to state 217 to perform the routine cursor icon select 220, deselect 241, and drag 220 functions (217, 218, 219, 220, 240, 241, see discussion of similar processing for states 206, 230, 235, 207, 208 and 209 above). Then the computer returns to state 204.

Figure 10C:
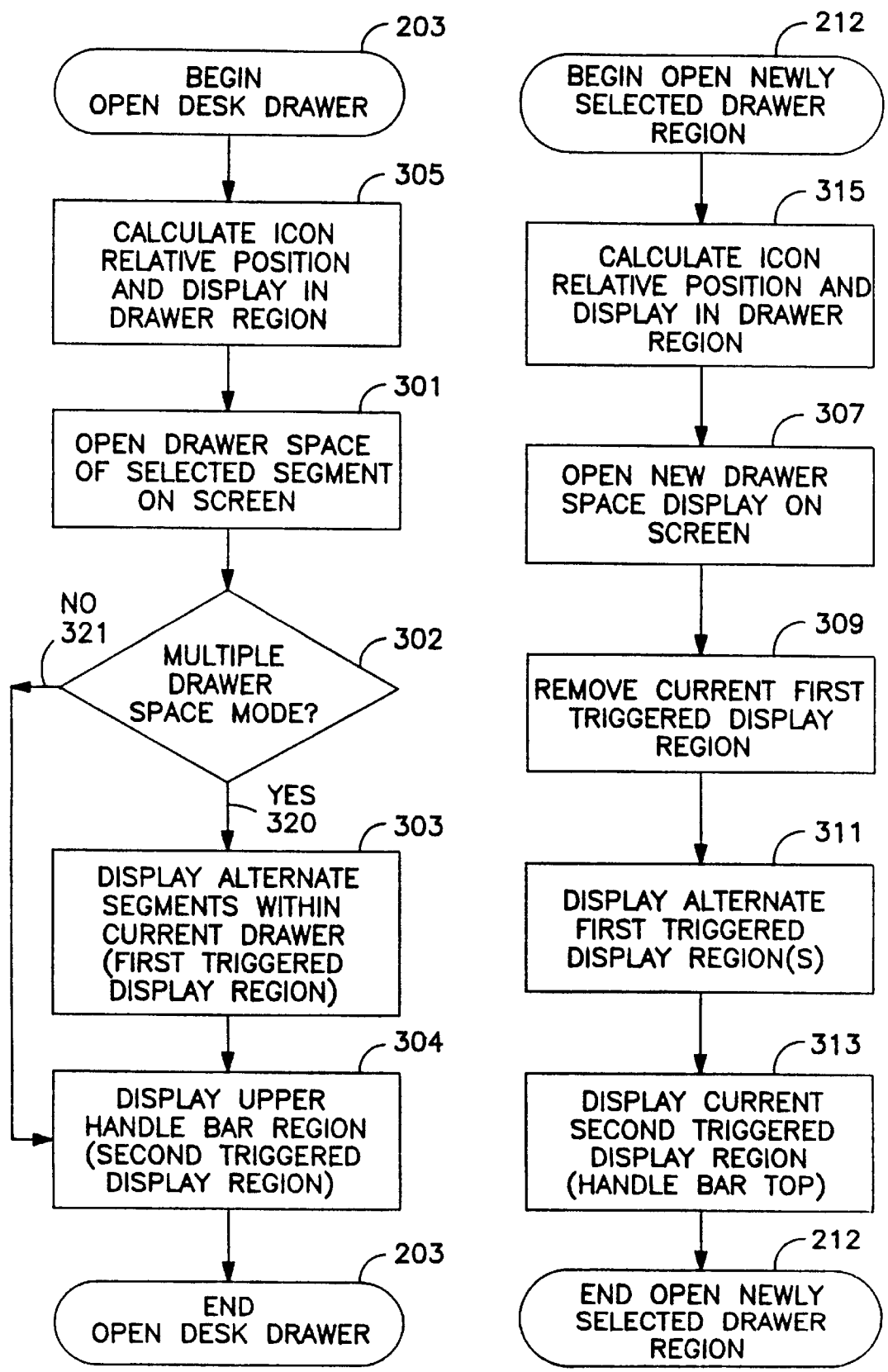
FIG. 10c is an expanded flow of Desk Drawer functions.

FIG 10c shows a more detailed flow diagram of states 203 and 212. Referring to expanded state 203, this state operates under both modes of single or multiple drawer spaces. At state 305, the screen positions of the icons, including icon lateral position, are calculated from their relative positions and placed on the display screen concurrently with the display of state 301. The processing logic at state 301 opens the selected drawer space and displays that portion on the display screen. At state 302 multiple drawer operation is determined. If multiple then state 303 is entered, else state 304 is entered. At state 303 if multiple drawer spaces have been selected then alternate segments are displayed within the current drawer space so that other drawer spaces may be selected. These alternate segments are called alternate first triggered display regions. Also within state 303, the current first triggered display region is removed since the current drawer space is displayed. At state 304 the handle bar region of the selected drawer space is displayed at the upper portion of the display region. This handle bar region is called the second triggered display region. The processing then exits expanded state 203.

Referring still to FIG. 10c, expanded state 212 operates under multiple drawer space mode. State 315 calculates the screen icon positions, including icon lateral position, from their relative positions and displays the icons on the display screen. Next, state 307 opens the new drawer space and places it on the screen. State 309 removes the current first triggered display region, the segment that triggered the new drawer space to open. State 311 displays the alternate segments representing the other drawer spaces, alternate first triggered display regions. State 313 displays the second triggered display region, or handle bar used to adjust the size of the drawer space for each drawer. The processing then exists expanded state 212.

The preferred embodiment of the present invention, a computer controlled software user interface providing a ready access secondary display region, is thus described. While the present invention has been described in one particular embodiment, it should be appreciated that the present invention should not be construed as limited by such embodiment.

What is claimed is:

1. In a computer controlled information management system including a display screen containing a first display region which allows the display of a plurality of overlapping windows at a given time, a method comprising:

displaying a second display region covering at least a portion of said first display region and any windows being displayed within said portion of the first display region, said second display region, when present in a mode, being completely viewable within said display screen such that, while said second display region is displayed it is always displayed over and covering other data including said plurality of windows to the extent said plurality of windows are in said portion of said first display region;

resizing said second display region by positioning a pointer displayed on said display screen on a first region of said second display region;

selectively transferring information from said second display region into one of said plurality of windows.

2. A method as in claim 1 wherein said step of selectively transferring information comprises selecting a selected information and dragging the selected information from said second display region to said one of said plurality of windows.

3. A method as in claim 2 wherein said second display region is a window.

4. A method as in claim 2 wherein said second display region comprises a trigger region which is displayed when said second display region is not displayed.

5. A method as in claim 4 wherein said trigger region, when displayed cannot be obscured on said display screen by any of said plurality of windows.

6. A computer readable medium containing executable program instructions for:

displaying a first display region which allows the display of a plurality of windows on a display screen;

displaying a second display region which covers at least a portion of said first display region and any windows being displayed within said portion, said second display region, when present in a mode, being completely viewable on said display screen such that, while said second display region is displayed, it is always displayed over and covering said plurality of windows to the extent said plurality of windows are in said portion of said first display region;

resizing said second display region by positioning a pointer displayed on said display screen on a first region of said second display region;

selectively transferring information from said second display region into one of said plurality of windows.

7. A computer readable medium as in claim 6 wherein said step of selectively transferring information comprises selecting a selected information and dragging the selected information from said second display region to said one of said plurality of windows.

8. A computer readable medium as in claim 7 wherein said second display region is a window.

9. A computer readable medium as in claim 7 wherein said second display region comprises a trigger region which is displayed when said second display region is not displayed.

10. A computer readable medium as in claim 9 wherein said trigger region, when displayed cannot be obscured on said display screen by any of said plurality of windows.

\* \* \* \* \*